United States Patent [19]

Maddox et al.

[11] Patent Number: 4,710,020

[45] Date of Patent: Dec. 1, 1987

[54] BEACON PROXIMITY DETECTION SYSTEM FOR A VEHICLE

[75] Inventors: James F. Maddox, Arlington; Mark B. Kadonoff, Somerville, both of Mass.; Alan D. Berger, Pittsburgh, Pa.; Amy L. Taivalkoski, Salem; Robert W. George, II, Windham, both of N.H.; Faycal E. Benayad-Cherif, Somerville, Mass.

[73] Assignee: Denning Mobil Robotics, Inc., Woburn, Mass.

[21] Appl. No.: 864,292

[22] Filed: May 16, 1986

[51] Int. Cl.[4] .......................... G01C 3/00; B25J 5/00
[52] U.S. Cl. .......................................... 356/1; 901/1; 364/424; 180/167
[58] Field of Search ................ 356/1, 4, 141; 342/46; 901/1; 364/424, 444; 180/167, 168

[56] References Cited

FOREIGN PATENT DOCUMENTS 60-63698 1/1985 Japan .

OTHER PUBLICATIONS

Kujiwara, T., "Developments of a Mobile Robot for Security Guard," 15th ISIR, pp. 271-278, 1984.
"Towards Autonomous Vehicles," 1984 *Annual Research Report*, Robotics Institute, Carnegie-Mellon University, pp. 33-49, 1985.

*Primary Examiner*—Stephen C. Buczinski
*Assistant Examiner*—Linda J. Wallace
*Attorney, Agent, or Firm*—Joseph S. Iandiorio; Douglas E. Denninger

[57] ABSTRACT

A proximity detection system for determining the distance between a vehicle and a navigation beacon by resolving the altitude angle between the beacon and the vehicle and determining the distance between them. The system then defines an optimum distance between the beacon and the vehicle and compares the determined distance and the optimum distance to establish any difference between them.

24 Claims, 29 Drawing Figures

BEACON PROXIMITY DETECTION SYSTEM FOR A VEHICLE

FIELD OF INVENTION

This invention relates to a system for detecting proximity of a vehicle to a navigation beacon, and more particularly to such a system for use in a mobile robot.

CROSS-REFERENCES

The following applications, filed concurrently herewith, are incorporated herein by reference:

| Inventors | Title | Serial No. |
| --- | --- | --- |
| Maddox et al. | Intrusion Detection System | 864,032 |
| Muller et al. | Ultrasonic Ranging System | 864,002 |
| Benayad-Cherif et al. | Position Locating System for Vehicle | 864,031 |
| Pavlak et al. | Power-Up Sequencing Apparatus | 864,590 |
| Kadonoff et al. | Orientation Adjustment System and Robot Using Same | 864,450 |
| Kadonoff et al. | Obstacle Avoidance System | 864,585 |
| Kadonoff et al. | Beacon Navigation System and Method for Guiding a Vehicle | 864,442 |
| George II et al. | Recharge Docking System for Mobile Robot | 864,028 |

BACKGROUND OF INVENTION

Knowledge of the location of a vehicle relative to its environment is crucial, particularly for autonomous vehicles. Presently there are a number of distinct systems which utilize internal or external reference systems to estimate position.

Internal reference is typically provided by inertial reference utilizing a gyroscope. Accurate gyroscopes, particularly digitally readable ones, are quite expensive and are relatively delicate.

Internal reference can also be provided by dead reckoning. Encoders on the drive system record the distance travelled by the wheels or tracks of the vehicle. This technique, also known as odometry, further includes steering encoders to record changes in orientation.

Other systems model the surrounding environment by reducing the environment to geometric features. The vehicle matches the perceived geometric model with the expected model and correlates them to determine its offset in position. The environment is typically modelled as a series of line segments representing surface features, or as a grid representing the probability of presence or absence of objects within particular locations.

Yet other systems rely on a number of markers placed in the environment. A landmark system utilizes markers placed along a path to denote the distance travelled.

Some systems calibrate positions at predetermined locations, or nodes, where a number of markers are installed to permit triangulation. One system uses three infrared beacons to triangulate position. Triangulation can also be accomplished using other forms of energy such as radio waves.

Another system triangulates its position using a rotating laser. The laser beam reflects off corner reflectors at designated locations. The system determines the angles among the reflectors to triangulate its position.

SUMMARY OF INVENTION

It is therefore an object of this invention to provide an improved beacon proximity detection which determines the position of a vehicle along a path.

It is a further object of this invention to provide such a beacon proximity detection which calibrates position from a single reference point.

It is a further object of this invention to provide such a beacon proximity detection which eliminates the need for multiple reference points within view of the vehicle during position calibration.

Yet another object of this invention is to provide such a beacon proximity detection for use in a mobile robot.

The invention results from the realization that truly effective realignment of the position of a vehicle navigating along a path toward a navigation node can be achieved by a system which resolves the altitude angle between the vehicle and a beacon, determines the distance between the beacon and the vehicle, defines for the node the optimum distance between the vehicle and the beacon, and compares the determined distance with the optimum distance to establish any difference between them.

This invention features a proximity detection system for determining the distance between a vehicle and a navigation beacon. There are detector means, responsive to the beacon, for resolving the altitude angle between the beacon and the vehicle and means, responsive to the resolved altitude angle and to the height of the beacon, for determining the distance between the beacon and the vehicle. There is also means for defining an optimum distance between the beacon and the vehicle and for comparing the determined distance and the optimum distance between the beacon and the vehicle to establish any difference between them.

In one embodiment, the system further includes means for supplying to the means for defining the height of the beacon and an additional known geometric parameter for the optimum distance. The means for defining includes means for generating the difference in distance of the vehicle as a function of the resolved altitude angle, the known geometric parameter, and the known height. The known geometric parameter may be the expected altitude angle between the detector means and the beacon at the optimum distance and the means for defining calculates the difference in position according to the formula $$\Delta X = (\theta_{VE} - \theta_{VA}) \frac{e}{\sin^2(\theta_{VA})}$$

where delta X is the difference in position, $\theta_{VE}$ is the expected altitude angle, $\theta_{VA}$ is the actual altitude angle, and e is the known height. Alternatively, the additional known parameter is the expected horizontal distance of the vehicle to the beacon.

In another embodiment, the detector means includes a multisector sensor for sensing a signal emitted by the beacon, and means responsive to the sensor sectors for generating an angle data signal representative of the angle from the sensor to the beacon in at least the altitudinal dimension. The sensor may be a lateral effect photodiode and the detector means further includes means responsive to the altitudinal angle for calculating the direction from the sensor to the beacon.

In yet another embodiment, the proximity detection system further includes means for adjusting the position of the vehicle by the established difference and the system further includes inclinometer means for sensing deviation of the vehicle from vertical. The means for defining includes means for combining the vertical deviation and the resolved altitude angle with each other and substituting the combined value for the resolved altitude angle to establish the difference in position.

This invention also features a proximity detection system for determining the distance between a mobile robot and a navigation beacon, including detector means for resolving the altitude angle between the beacon and the robot, means for determining the distance between the beacon and the robot, and means for defining an optimum distance between the beacon and the robot and for comparing the determined distance with the optimum distance between the beacon and the robot to establish any difference between them. The system may further include means for adjusting the position of the robot by the established difference and the robot may include a synchro-drive locomotion system.

This invention further features a proximity detection system for determining the distance between a vehicle and a navigation beacon including at least one beacon, detector means for resolving the altitude angle between the beacon and the vehicle, means for determining the distance of the beacon and the vehicle, and means for defining an optimum distance between the beacon and the vehicle and for comparing the determined distance and the optimum distance between the beacon and the vehicle to establish the difference between them.

In one embodiment, the beacon includes means for emitting detectable energy and the beacon may be a point source. The beacon includes means for producing the energy in a coded signal which uniquely identifies that beacon. The system may further include means for supplying the height of that uniquely identified beacon such as memory means in the vehicle for storing the known height for that beacon. The detector means includes a multisector sensor for sensing the signal emitted by the beacon, and means for generating a code data signal representative of the coded signal. The detector means also includes means, responsive to the sensor sectors, for generating an angle data signal representative of the angle from the sensor to the beacon in at least the altitudinal dimension. The beacon is positioned along the axis corresponding to the intended direction of travel of the vehicle.

DISCLOSURE OF PREFERRED EMBODIMENT

Other objects, features and advantages will occur from the following description of a preferred embodiment and the accompanying drawings, in which.

Figure 1:
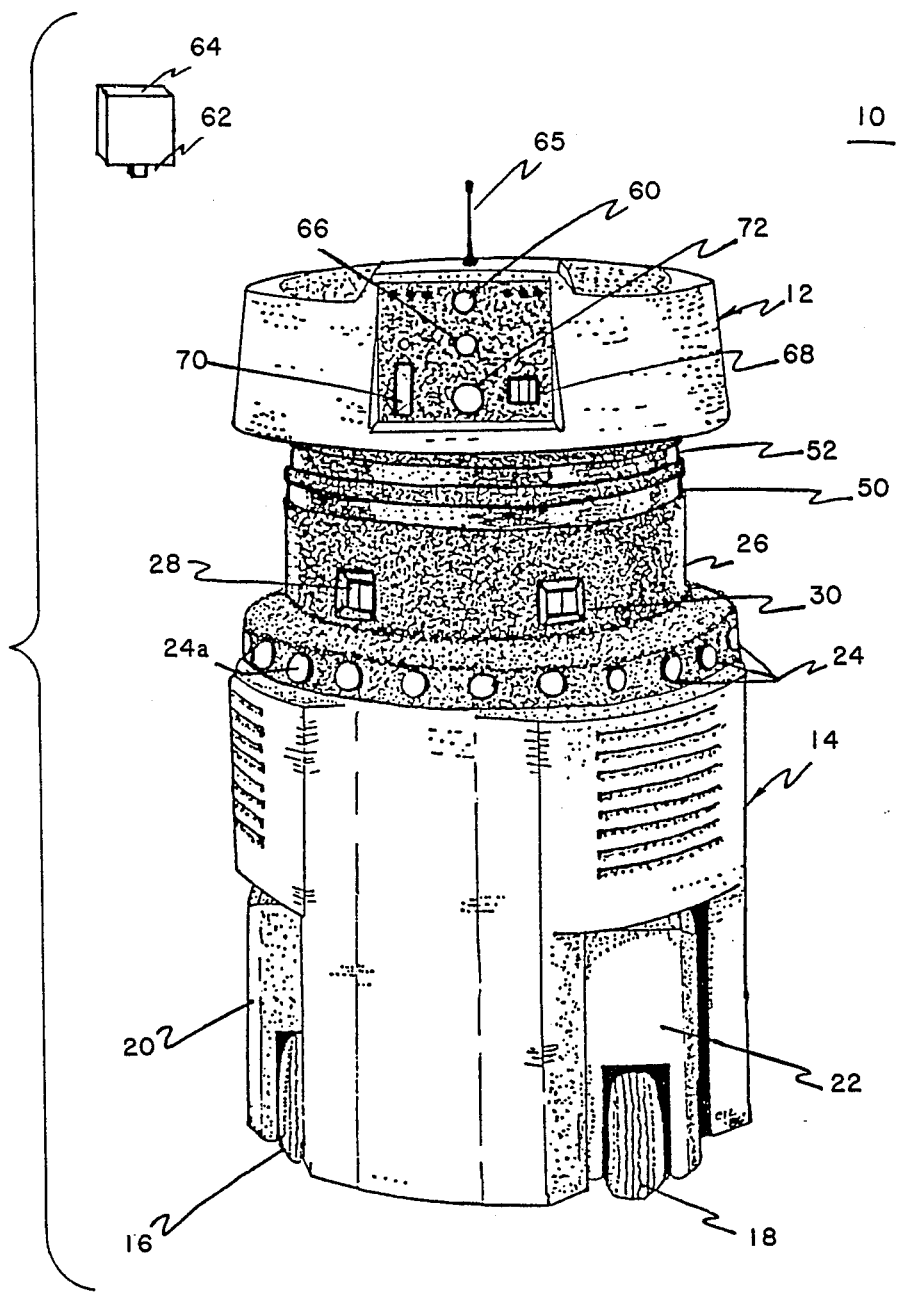
FIG. 1 is an axonometric view of a robot utilizing the orientation calibration system according to this invention.

There is shown in FIG. 1 a vehicle, robot 10 according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers 24 such as the electrostatic transducer of the Sell type available from Polaroid equally spaced at fifteen degrees around the periphery of base 14. One of transducers 24, such as transducer 24a, is designated as sensor zero; its azimuthal heading is utilized as described below. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 12 also includes an infrared sensor 60 for sensing radiation in the near infrared region, e.g. 880 nm, such as emitted from LED 62 of beacon 64, one or more of which are mounted on the walls in the space to be protected by robot 10 to assist in locating and directing robot 10 in the area in which it is to roam. An ultrasonic transducer 66 similar to one of the transducers 24 used for maneuvering and avoidance may be provided for ranging. There is also provided a passive infrared sensor 68 similar to sensors 28 and 30. A microwave transmission and reception antenna 70 and a TV camera 72 which may be turned on when an apparent intrusion has occurred; these are also included in head 12.

Figure 2:
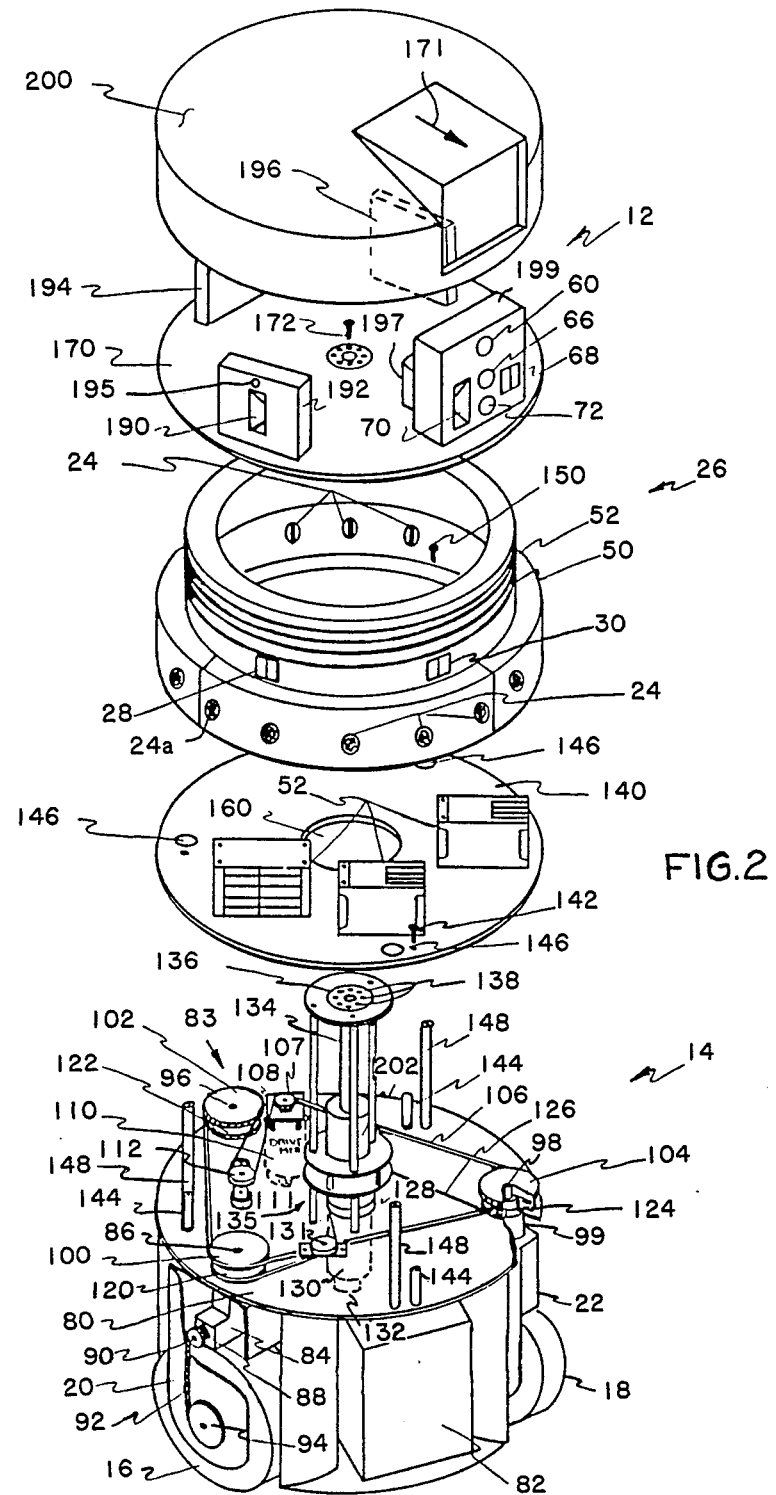
FIG. 2 is a simplified exploded view with parts removed of the robot of FIG. 1.

Base 14, FIG. 2, includes a main chassis 80 which carries three batteries 82 such as Globe 12 V 80 AH gel cells, only one of which is shown. When fully charged they will operate the robot for twelve hours or more.

Robot 10 is provided with a synchro-drive locomotion system 83. The wheels are steered simultaneously and driven simultaneously. By steering simultaneously, base 14 optimally maintains an azimuthal angle which is fixed in space and serves as the basic reference of the robot to the outside world. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88 to operate pulley 90. Pulley 90 through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106.

Three additional shafts concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motor shaft is connected through pulley 128 to extension shaft 134, the top of which is provided with a flange 136 with a plurality of mounting holes 138. Position sensor 135, such as a Hall Effect device, interacts with a magnetic detent on shaft 134 as described below. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated as items 152 that are contained in the base 14, including the status module described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. Arrow 171 represents the frontal, forward-facing orientation of head 12.

In addition to the primary microwave sensor 70 there are three additional microwave sensors only one of which, 190, is visible spaced at ninety degrees about head plate 170 mounted in housings 192, 194, and 196. One or more additional ultrasonic sensors can also be mounted in head 12, e.g., ultrasonic sensor 195 on housing 192. Housing 194 faces directly to the back of the head as opposed to primary microwave sensor 70 which faces front. Housing 194 also contains a second infrared sensor, not visible, which is the same as infrared sensor 68.

Head 12 also contains internal reference sensors. Inclinometer 197, such as the ACCUSTAR Clinometer Sensor available from Sperry Corp., is mounted on the rear portion of external sensor housing 199. Its use in X axis calibration according to this invention is described below.

Cover 200 protects the electronics on head plate 170. All of the electrical interconnections between head 12 and base 14 are made through slip rings contained in slip ring unit 202 mounted about extension shaft 134 in base 14.

Figure 3:
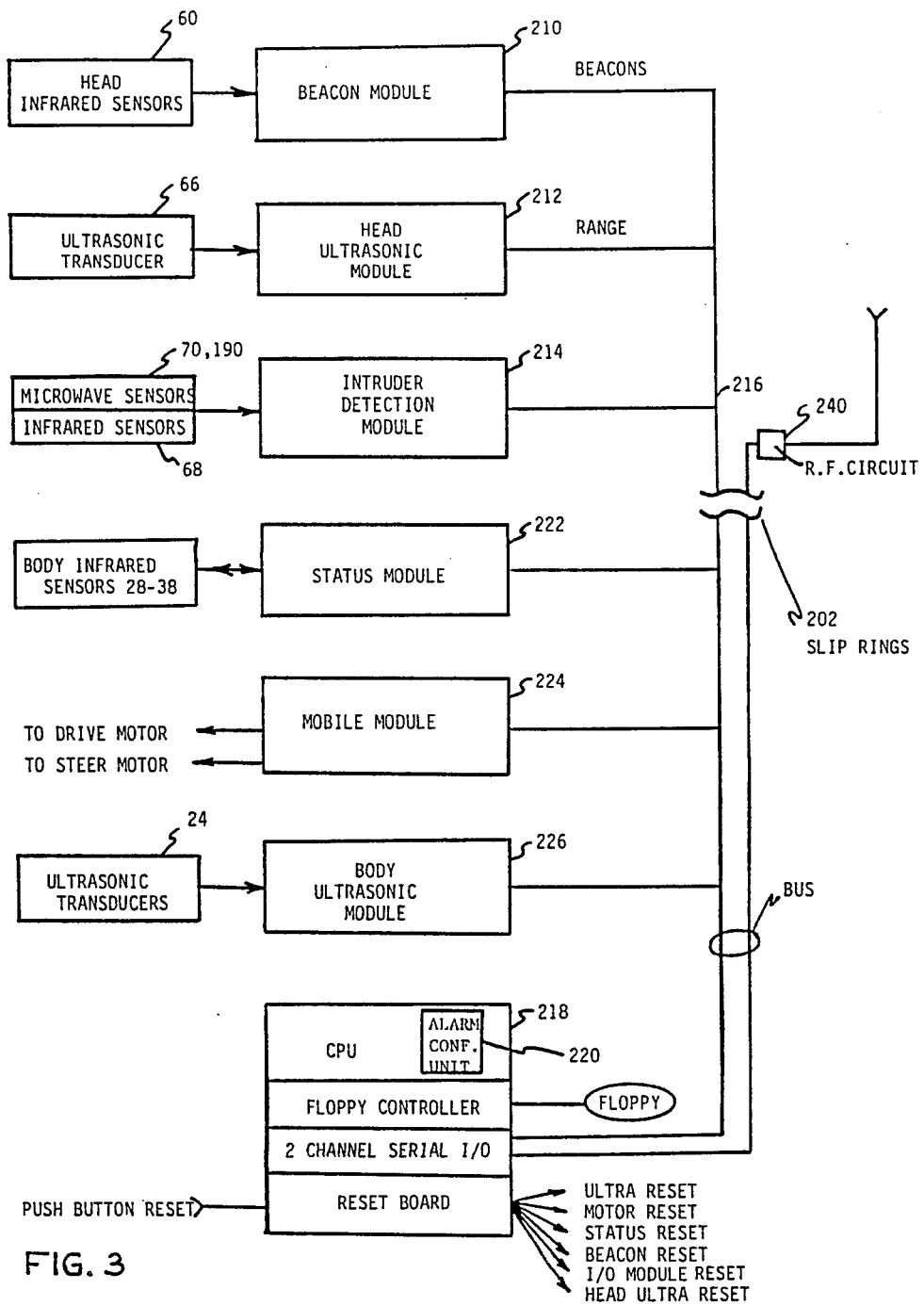
FIG. 3 is a block diagram of the electronic modules included in the robot of FIGS. 1 and 2.

Head 12, FIG. 3, includes three electronic portions: beacon module 210, head ultrasonic module 212, and intrusion detection module 214. Beacon module 210 responds to the IR sensor 60 to determine what angle the beacon 64 is with respect to the robot. That angle is fed on bus 216 through the slip ring unit 202 to the main CPU 218. Beacon module 210 is also responsive to inclinometer 197.

Head ultrasonic module 212 responds to ultrasonic transducer 66 to provide ranging information on bus 216 to CPU 218. Intruder detection module 214 responds to the four microwave sensors such as sensors 70, 190, and the two IR sensors such as sensor 68, to provide indications as of yet unconfirmed intrusion events. These events are processed by the alarm confirmation unit 220 in CPU 218 to determine whether a true confirmed intrusion has occurred.

In the body section 14, there is included status module 222, mobile module 224, body ultrasonics module 226, and CPU 218. Status module 222 responds to the six infrared sensors 28–38 to provide an indication of an intrusion. Status module 222 may also monitor fire and smoke detectors, diagnostic sensors throughout the robot such as inclinometer 197, as well as chemical and odor detectors and other similar sensors. Mobile module 224 operates and monitors the action of drive motor 110 and steering motor 130. The twenty-four ultrasonic transducers 24 provide an input to the body ultrasonic module 226, which provides digital range information for the robot. Finally, body 14 contains CPU 218, which in addition to the alarm confirmation unit 220 also interconnects with a floppy disk controller, a two-channel serial I/O board, and a reset board which receives inputs from a pushbutton reset and CPU 218 and provides as outputs ultrasonic resets, motor resets, status resets, beacon resets, I/O module resets and head ultra resets. CPU 218 also receives inputs from RF antenna 65 through RF circuit 240.

Figure 4A:
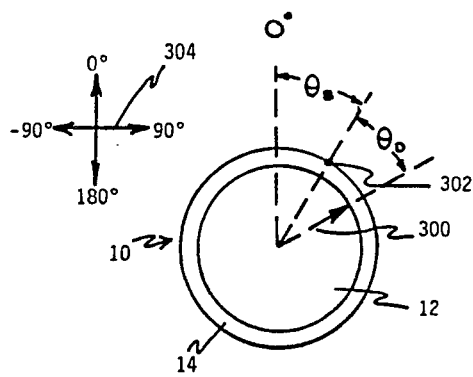
FIG. 4A is a schematic top plan view of the relationship between the head and the body to each other and relative to the environment.

Several notations describe the orientation of head 12 to body 14, as shown in FIG. 4A. Arrow 300 represents its front, which faces the direction of travel, shown as front arrow 171 in FIG. 2. The azimuthal orientation of body 14, FIG. 4A, is represented by point 302, hereinafter referred to as sensor zero. Sensor zero is a designated, fixed point on body 14 itself, e.g. sensor 24a, FIG. 2. The angle between head front 300 and body zero is $theta_D$. The azimuthal angular distance from global zero to sensor zero is represented by $theta_B$; arrows 304 represent the designated orientation for the surrounding environment.

Figure 4B:
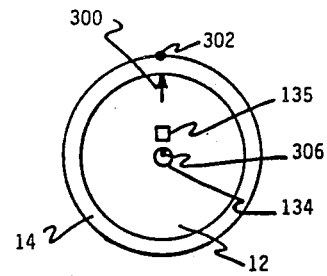
FIG. 4B is a schematic top plan view of alignment between the head and the body using a position encoder.

Head 12 is realigned with base 14 using position sensor 135 and magnetic detent 306 on shaft 134 as shown in FIG. 4B. This is accomplished at designated homing nodes by rotating head 12, that is, by pivoting the three steerable trucks, about its vertical axis such that magnetic detent 306 is brought into alignment with position sensor 135 of base 14. The head direction angle $theta_D$ is then set to zero; this and other operational parameters of the robot are maintained in updatable memory, hereinafter referred to as the blackboard, in CPU 218, FIG. 3.

Figure 4C:
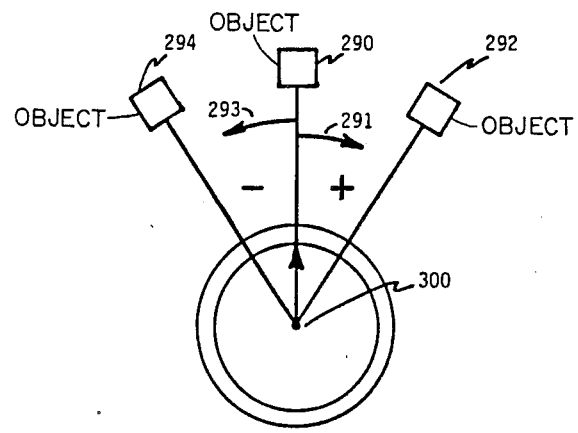
FIG. 4C is a schematic top plan view of the sign of angles in relation to the front of the robot.

The sign of angles is determined as shown in FIG. 4C. Object 290 is directly aligned with robot front 300. Angles in the clockwise direction, indicated by arrow 291 between object 290 and object 292, are positive in value. Angles in the counterclockwise direction, shown by arrow 293 toward object 294, are negative.

Figure 5A:
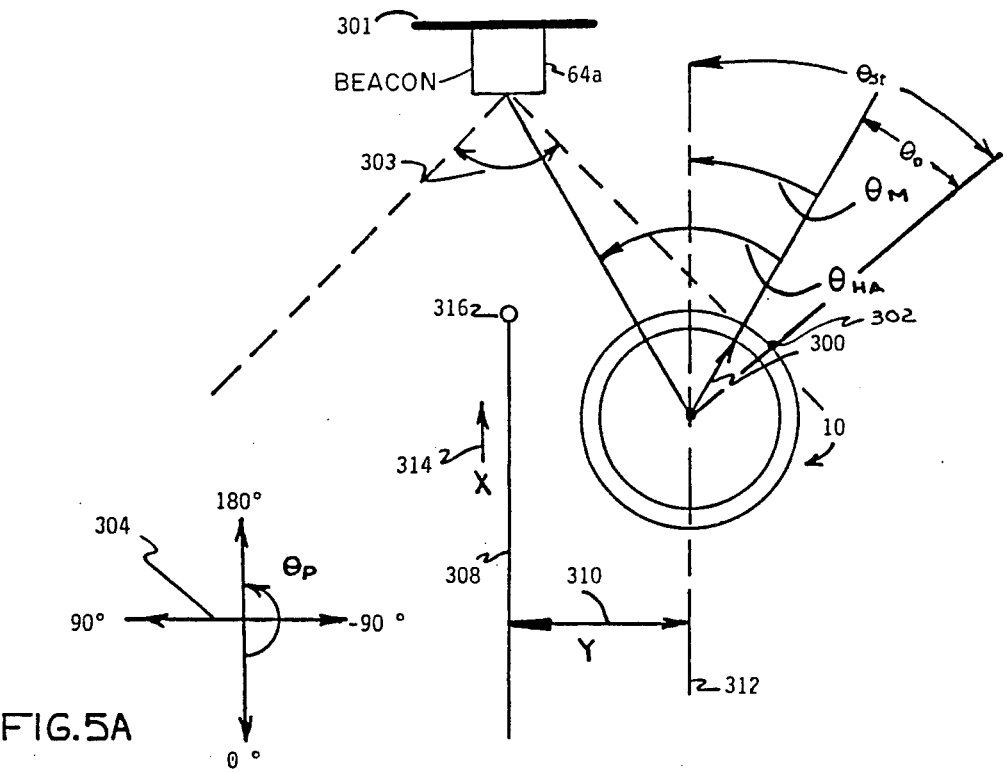
FIG. 5A is a schematic top plan view of the angles and distances between the robot, a predetermined node, and a beacon.

The position and orientation of robot 10 relative to beacon 64a is shown in FIG. 5A. $theta_{HA}$ is the actual horizontal angle, that is, the azimuthal angle, between head front 300 and beacon 64a. Beacon 64a has a 30° transmitter beam width, indicated by arrow 303, which is detected by sensor 60, FIGS. 1 and 2, within its 22° field of view. The expected horizontal angle, $theta_{HE}$, is zero when robot 10 is properly following path 308 towrd wall 301. Horizontal deviation from path 308 is designated by the variable y, here shown by arrow 310. The orientation of path 308 is represented by angle $theta_P$, which is 180° in relation to coordinate arrows 304.

Dashed line 312 parallels path 308. The angular deviation from the direction of path 308 to front 300 is represented by head-path angle $theta_M$. Sensor zero path angle $theta_{SZ}$ is the angle from the path to sensor zero 302. Head direction angle $theta_D$ is equal to the sensor zero path angle $theta_{SZ}$ subtracted from head-path angle $theta_M$. Angle $theta_{SZ}$ is equal to path angle $theta_P$ minus body angle $theta_B$.

Thus, body angle $theta_B$ serves as the basic reference for robot 10 to the outside world. The actual direction of an intruder, a fire or a path is determined for the robot in relation to sensor zero whose heading is updated by body angle $theta_B$.

Figure 5B:
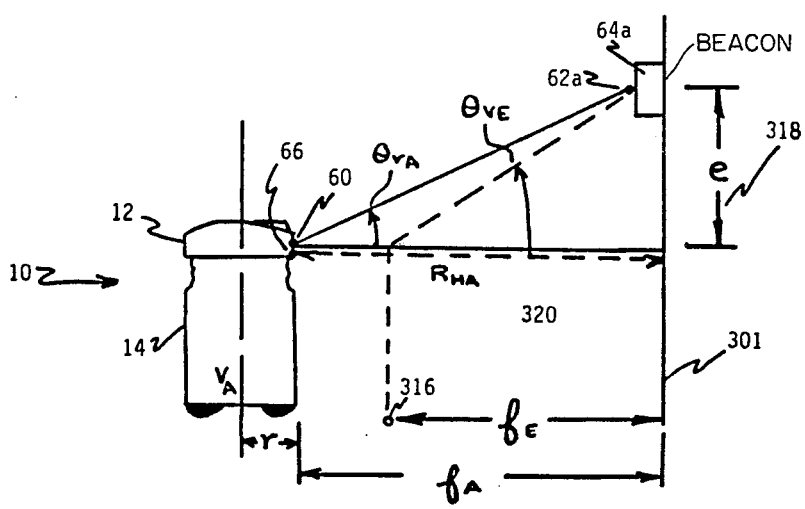
FIG. 5B is an elevational plan view of the robot and beacon of FIG. 5A relative to each other.

Body angle calibration, that is, the updating of the angular orientation between sensor zero and global zero, can be conducted at any place along path 308. Calibration of the distance travelled in the X direction, shown by arrow 314, must be conducted at a predetermined location such as node 316. As shown in FIG. 5B, the vertical angle, that is, the altitude angle, between beacon sensor 60 and LED 62a of beacon 64a is classified as actual vertical angle $theta_{VA}$. This is obtained while robot 10 is distance $f_A$ from wall 301. The expected vertical angle $theta_{VE}$ learned by initially placing robot 10 at node 316 to measure the angle. Inclinometer 197, FIG. 2, is utilized to correct for unevenness in terrain.

As described below, the expected distance $f_E$ is measured from node 316 to wall 301 and can be used instead of expected vertical angle $theta_{VE}$. In either case, the vertical distance between the height of beacon sensor 60 and LED 62a must be measured, represented by vertical distance e and shown by arrow 318. When the distance between wall 301 and vertical axis VA is desired, the robot's radius r is added to the trigonometric calculations.

The actual distance between robot 10 and wall 301 can also be measured by head ultrasonic sensor 66 within its 15° field of view. This distance measurement is denoted as horizontal distance $R_{HA}$ and is shown by dashed arrow 320.

Figure 5C:
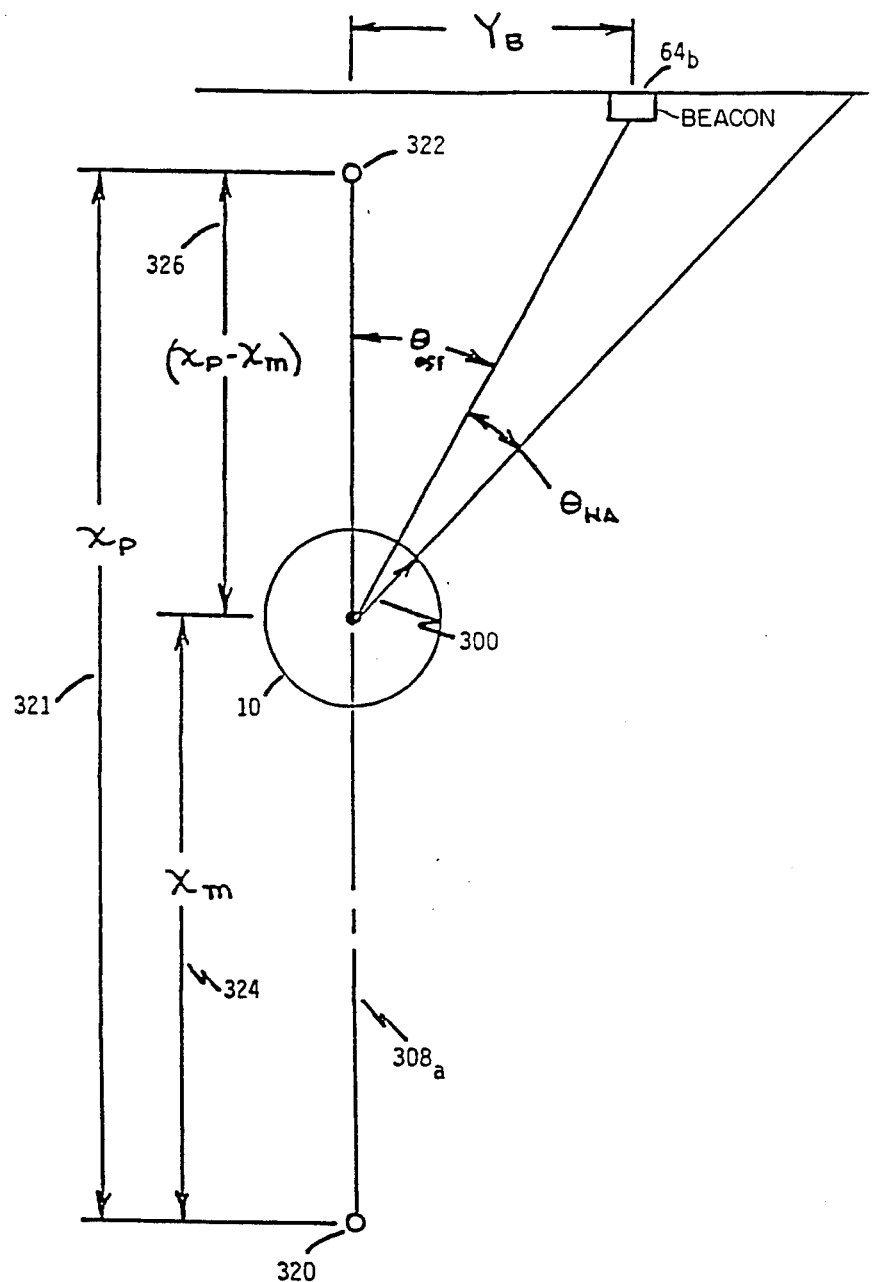
FIG. 5C is a schematic top plan view of the angles and distances between the robot, a selected path, and an offset beacon.

Geometric parameters describing the location of robot 10 along the path and its orientation relative to an offset beacon are shown in FIG. 5C. The path distance $X_p$ is represented by line 321 between start node 320 and end node 322. Line 324 represents the distance travelled, $X_M$, and line 326 designates the remaining distance to travel, $X_p - X_m$.

If the reference to be observed by robot 10 such as beacon 64b, is not directly aligned with path 308a, the angle between beacon 64b and path 308a is denoted by offset angle $theta_{off}$. Head horizontal angle $theta_{HA}$ represents the difference in orientation between head front 300 and beacon 64b.

Figure 6:
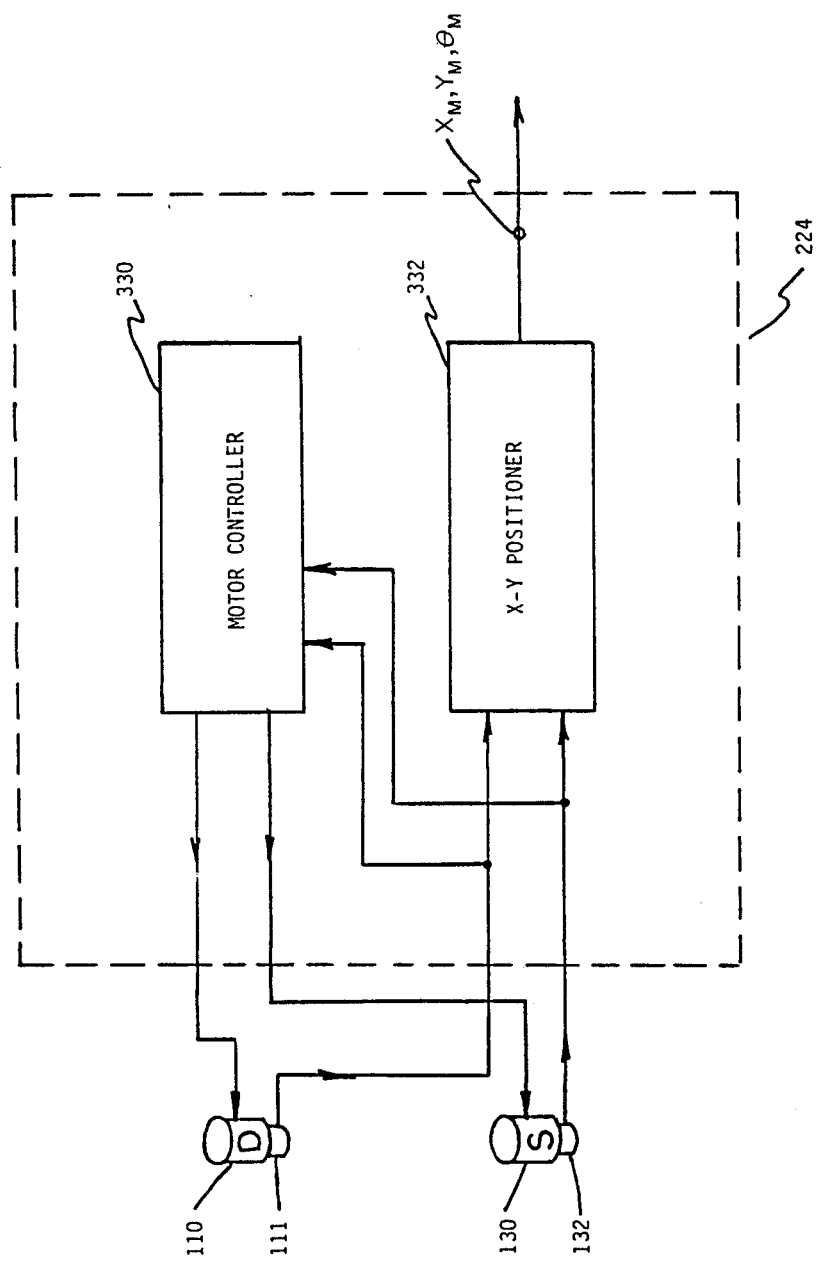
FIG. 6 is a schematic block diagram of the mobile module of FIG. 3.

An estimate of distance travelled and of location is maintained by dead reckoning accomplished by X-Y positioner 322 of mobile module 224, FIG. 6. Mobile module 224 includes motor controller 330, which controls drive motor 110 and steering motor 130. Distance travelled is determined by encoder 111 which provides this information to X-Y positioner 332. Similarly, steering encoder 132 provides change in orientation information to positioner 332, which accordingly outputs path distance $X_M$, path deviation $Y_M$, and head orientation $theta_M$, which denotes the angle of the head to the path. Encoders 111, 132 also provide feedback to motor controller 330.

Navigation of the robot through its environment is described in relation to successive nodes. Map 338, FIG. 7A, includes selected nodes 340 which have a known distance and angle among each other. The robot travels toward successive goal nodes. For example, if the robot is at node 4, the starting node, the robot can be directed to visit goal node 7. The paths required to accomplish this are designated in FIG. 7B as the global path 342. Global path 342 designates consecutive navigation nodes, and a list of paths between these nodes. At each node, the robot must change headings, recalibrate estimated position, and head towards the next node.

Figure 7A:
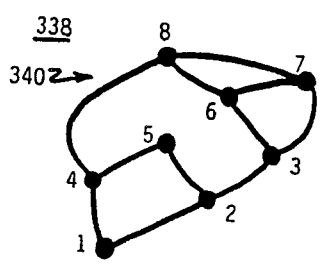
FIG. 7A is a schematic diagram of a map of a number of nodes established in the environment.
Figure 7B:
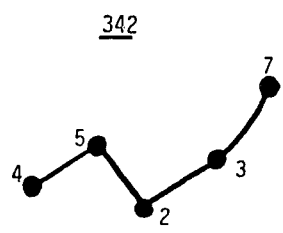
FIG. 7B is a schematic diagram of a global navigation path to a goal node within the map of FIG. 7A.
Figure 7C:
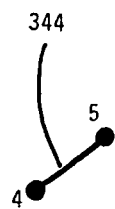
FIG. 7C is a schematic diagram of local navigation between two nodes of the global path of FIG. 7B.

Travel along the particular path is represented by path 344, FIG. 7C. Local navigation along path 344 moves the robot from node 4 to node 5.

The spatial models represented by FIGS. 7A-7C simply represent navigable paths through the environment and do not actually describe the surrounding environment. This system requires much less information than other systems utilizing more complicated techniques such as geometric modeling of the environment.

In addition to the identification of the starting node and the list of successive nodes to visit, the predetermined map information also includes a number of characteristics for each path. These include the distance of the path and its angle, $theta_P$, in relation to global zero. The path information may also include the width of the path, and, if a beacon is disposed at the end of the path, the beacon code, distance f, height e, and expected vertical angle $theta_{VE}$. The intensity of the beacon can be monitored to confirm proper operation of the beacon if it is an active beacon; expected intensity of passive beacons such as reflectors or bar codes are not required. One or more position calibration techniques can be specified, such as beacon proximity detection according to this invention to perform X-axis calibration, ultrasonic end-path calibration, and body-angle calibration.

Figure 8A:
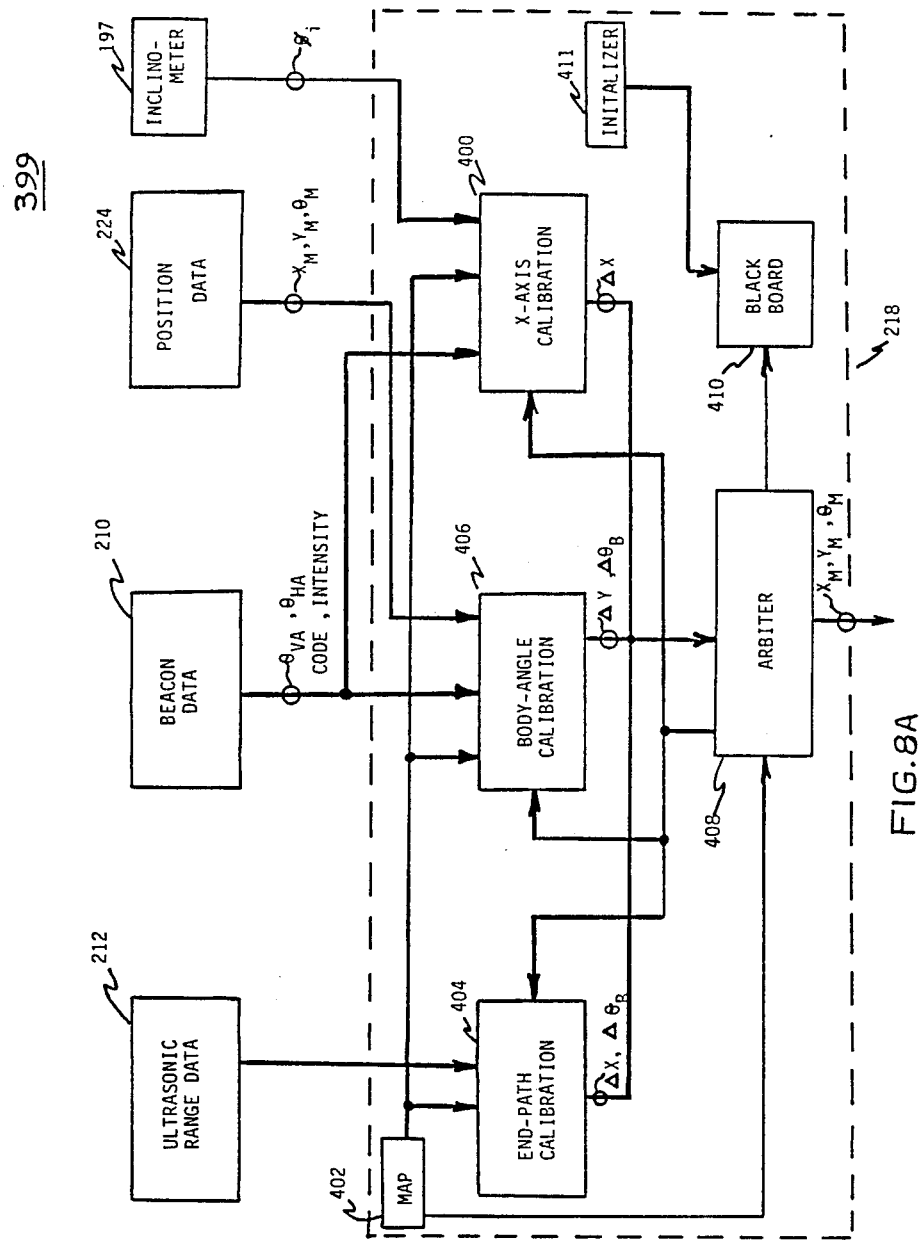
FIG. 8A is a schematic block diagram of position estimation utilizing beacon proximity detection according to this invention to perform X-axis calibration.

Robot 10 uses one or more position calibration systems 399 to estimate its position as shown in FIG. 8A. The position calibration systems 399 are located within CPU 218 and draw upon several modules. X-axis calibration system 400 according to this invention obtains the vertical deviation phi$_i$ from inclinometer 197, information from map 402, and actual vertical angle theta$_{VA}$ from beacon module 210.

End-path calibration system 404 provides an alternate technique of determining the difference in travel along the X-axis and determining adjustments to body angle theta$_B$. End-path calibration system 404 draws upon map 402 and ultrasonic range data from module 212.

Body-angle calibration system 406 corrects for accumulated error in orientation due to such factors as drift and precession of base 14. System 406 is responsive to map 402, beacon data including theta$_{HA}$ from beacon module 210 and data from mobile module 224 representing present estimated position and head orientation.

After obtaining one or more calibrations from calibration systems 400, 404 and 406, arbiter 408 updates blackboard 410 which maintains current status information for robot 10 including its actual position Initializer 411 supplies initial values to blackboard 410, such as zeros generated for body angle theta$_B$. Arbiter 408 provides corrected Y$_M$ and theta$_M$ values to X-Y positioner 332, FIG. 6 while the robot is moving and while stationary provides X$_M$, Y$_M$ and theta$_M$ corrections to motor controller 330 which are implemented as directed.

Arbiter 408 uses end-path calibration from system 404 when nearing the end of the path and at the end of the path. Body-angle calibration from system 406 is examined along the path. X-axis calibration from system 400 is obtained only at selected nodes.

Figure 8B:
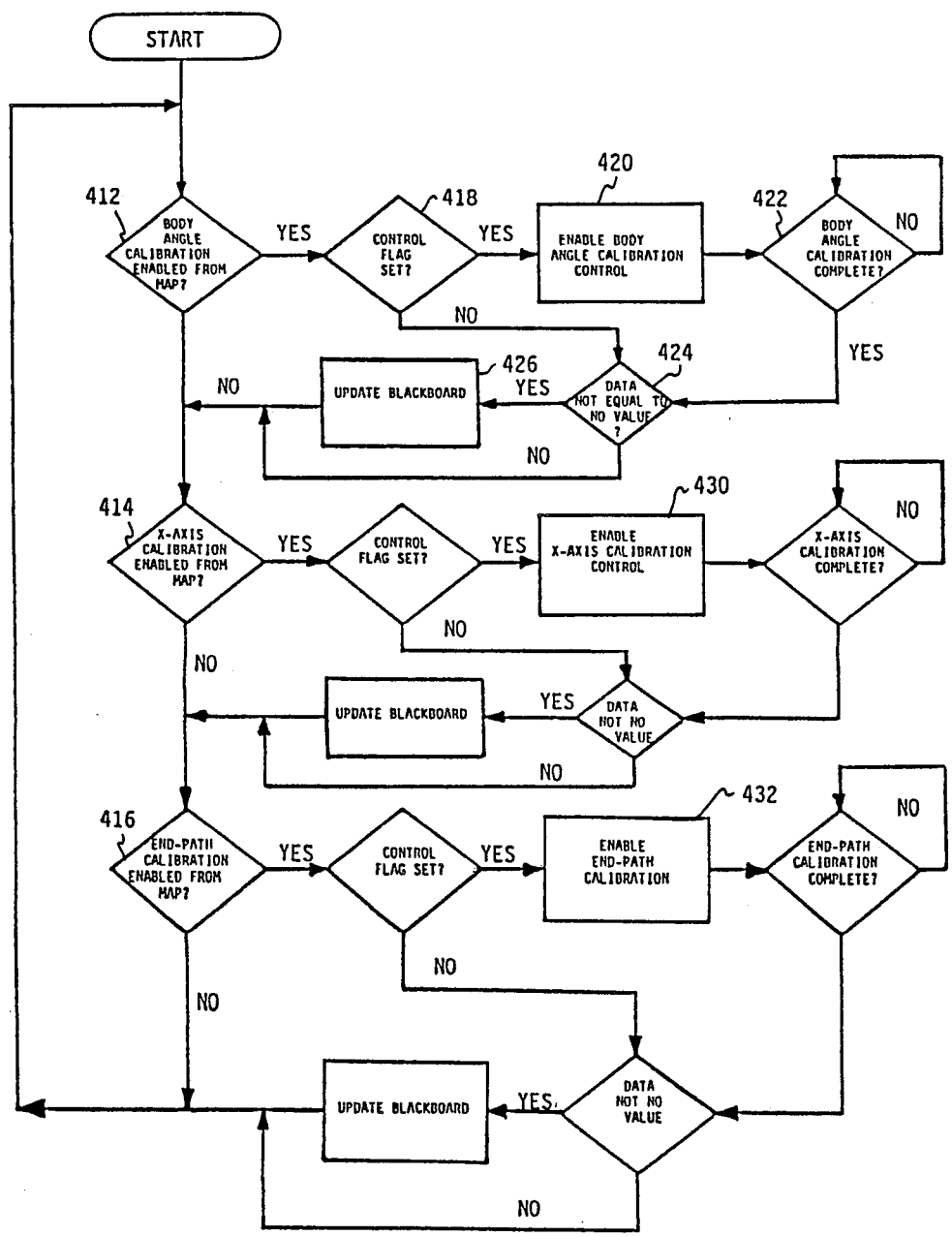
FIG. 8B is a flow chart of the arbiter of FIG. 8A.

The operation of arbiter 408 is shown in FIG. 8B. Calibration systems continually output calibration values or "NO VALUE" but are sampled to obtain their estimations of position only if enabled from map 402 for the particular path or node the robot presently occupies Calibration of body angle, X-axis, and end-path position are successively accessed, steps 412, 414 and 416, respectively. Further, the arbiter decides whether to relinquish control of the robot when a calibration system requests motor control.

If map 402 contains the appropriate enable for body angle calibration, step 412, the arbiter observes, step 418, whether calibration system 406 has requested control by setting its control flag. If it has, control is provided, step 420, unless an external override command (not shown) is present. The arbiter waits for body angle calibration to be completed, step 422, and then examines whether the output calibration data is other than "NO VALUE". Valid data is entered into blackboard 410 via step 426, while the operation proceeds directly to step 414 if the data are NO VALUE.

When the control flag is not set, step 418, examination of the output data is immediately made, step 424. Similarly, the outputs of X-axis calibration and end-path calibration are obtained, as represented by loops 430 and 432, respectively. During these calibrations, steps 434 and 436, control remains with the respective calibration systems until the difference between the actual and expected position of the robot along the path becomes zero.

Figure 9:
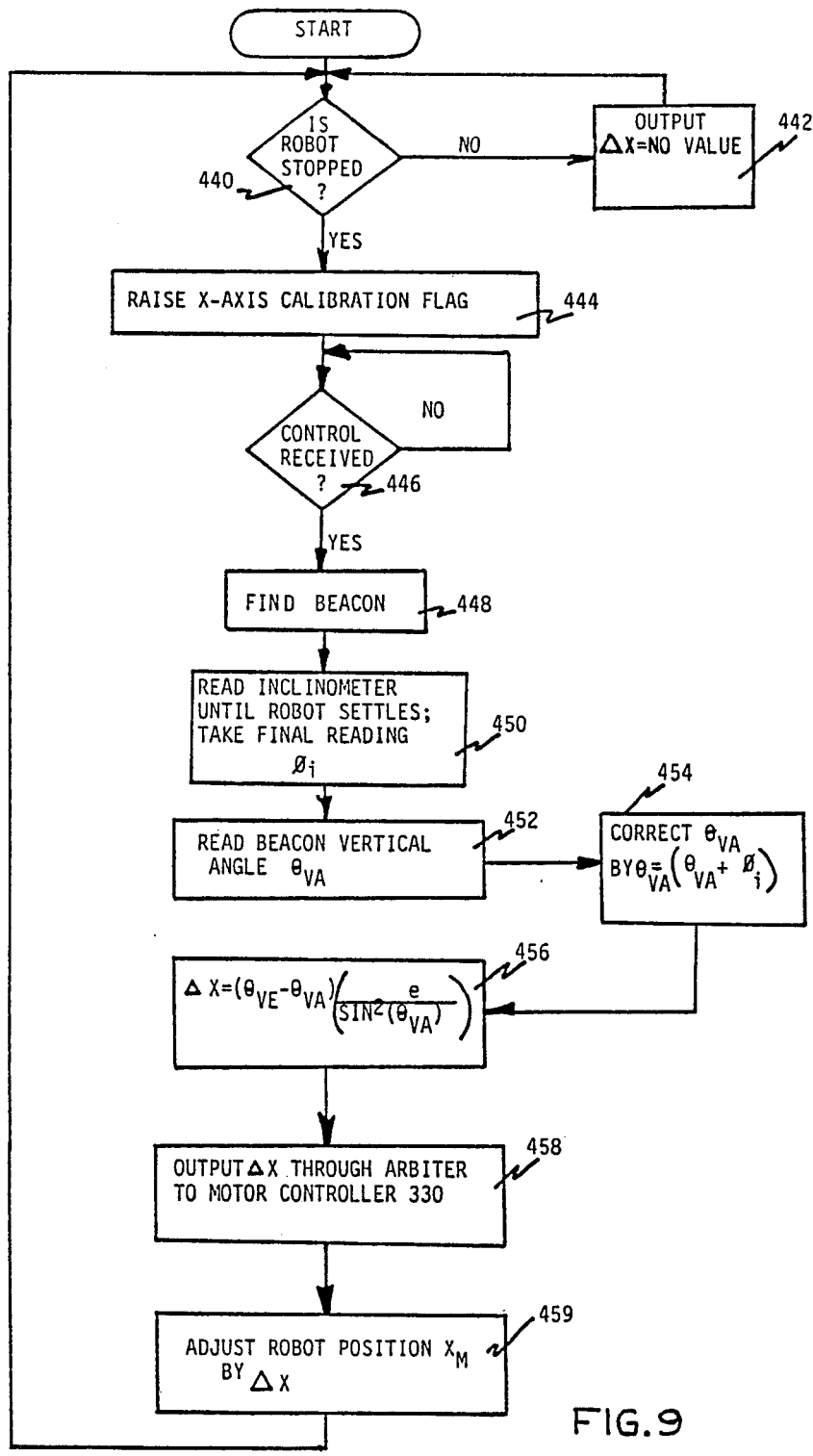
FIG. 9 is a flow chart of the X-axis calibration of FIG. 8A.

The operation of X-axis calibration system 400 is shown in FIG. 9. If the robot is stopped, step 440, a distance correction of delta X equal to NO VALUE is provided, step 442. When the robot is in a fixed position the X-axis calibration flag is raised, step 444, and the calibration system waits until control is received, step 448. The beacon is located, step 446, and inclinometer 197 is read until motion of the robot settles, step 450. Once stable, the final inclination reading, phi$_i$ is taken, as is the stable reading of vertical angle theta$_{VA}$, step 452. Actual vertical angle theta$_{VA}$ is corrected by inclination phi$_i$ which has a positive or negative value depending whether robot 10 is inclined toward or away from the beacon, respectively, step 454.

The difference between the expected X distance and the actual X distance is obtained in step 456 as represented by the trigonometric formula $$\Delta X = (\theta_{VE} - \theta_{VA}) \frac{e}{\sin^2(\theta_{VA})} \tag{1}$$

where delta X is the difference in position along the X-axis, theta$_{VE}$ is the expected vertical angle, theta$_{VA}$ the actual vertical angle, and e is the vertical elevation of the beacon as described in FIG. 5B. The value of delta X is provided to motor controller 330 through arbiter 408, step 458. The robot moves along distance X$_M$ by an amount equal to delta X, step 459. The operation cycles to step 440 and the robot is readjusted until a delta X of zero is resolved in step 456.

Other methods of calculating delta X can be used, for example, where the expected horizontal distance between the robot and the beacon is substituted for expected vertical angle theta$_{VE}$. The latter parameter is preferred because it can be obtained empirically in operations such as map making by locating the robot at the node or other predetermined location and instructing it to observe the beacon to learn the vertical angle. This obviates the need for physically measuring the horizontal distance between the robot and the beacon.

Figure 10A:
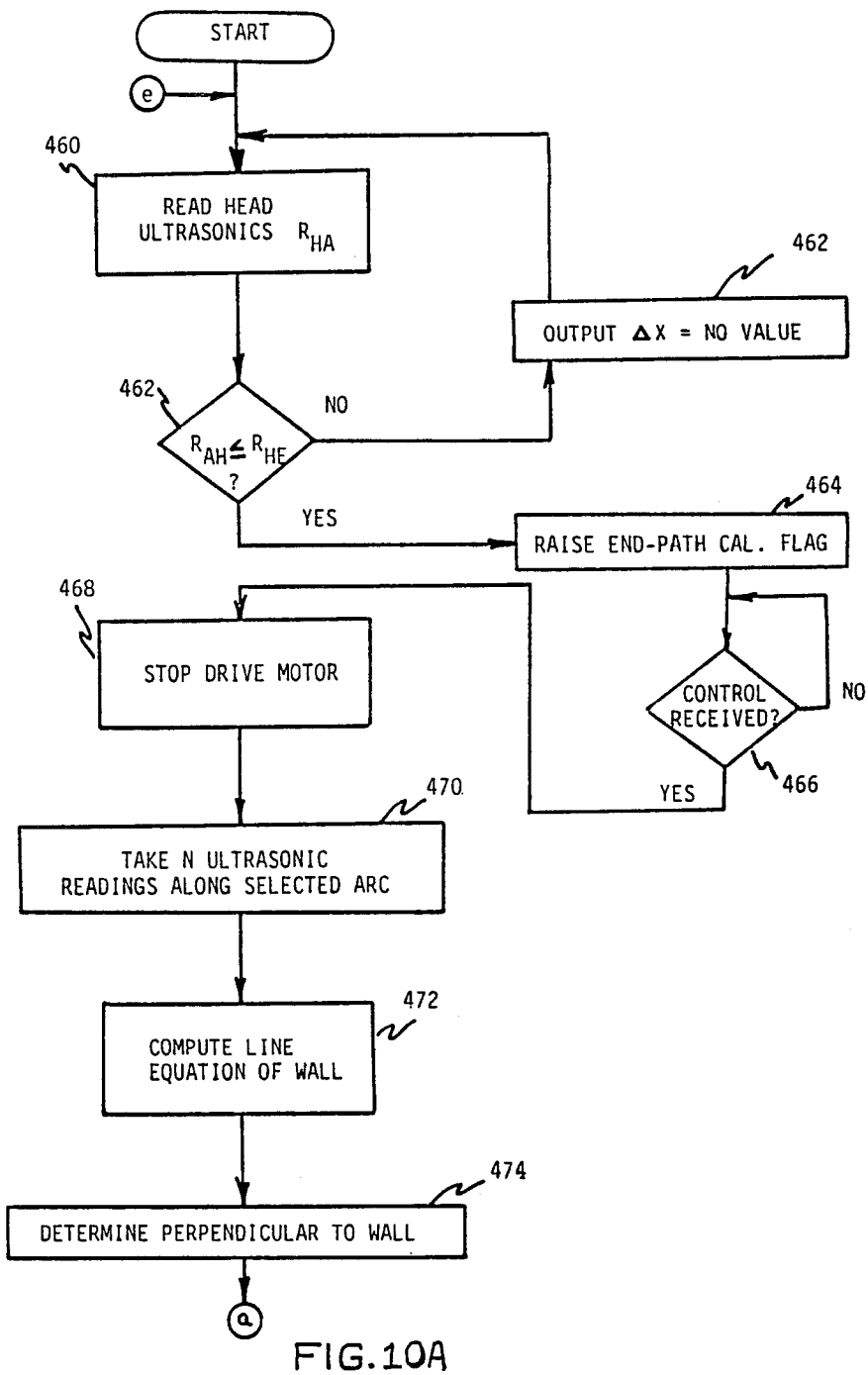
FIGS. 10A and 10B are flow charts of end-path calibration of FIG. 8A.

The operation of the end-path calibration system commences with reading of the head ultrasonic range R$_{HA}$, step 460, FIG. 10A. If the actual range is greater than the expected range, supplied by map 402, an output of "delta X equals no value" is generated, steps 462, 463, respectively.

Otherwise, if the observed range is less than or equal to the expected range, the end-path calibration flag is raised, step 464, and the calibration system waits until control is received, step 466. Once control is obtained, the calibration system commands that the drive motor halt, step 468, and commands head ultrasonic 66 of head 12, FIGS. 1 and 2, to take nultrasonic readings along a selected arc, such as fifteen readings along a 30° arc, each reading two degrees apart from the others, step 470. The minimum distance is found in step 472.

Figure 10B:
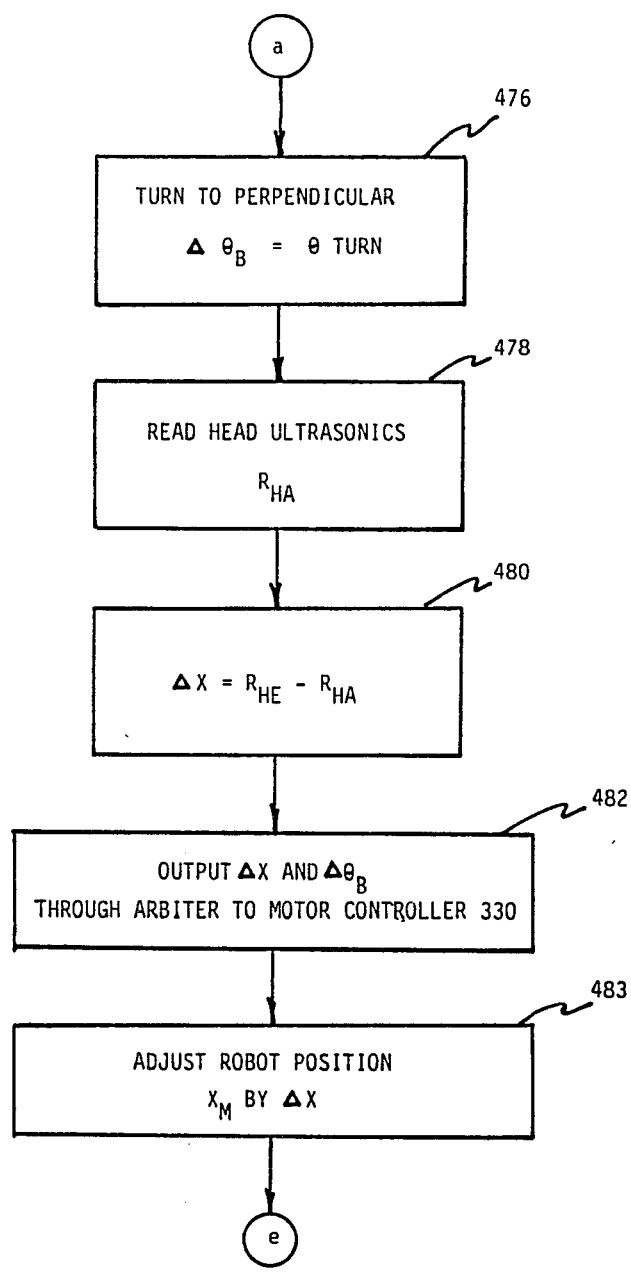

A direction perpendicular to the wall is computed, step 474, e.g., by using the angle which gave the minimum distance in step 472. The robot is commanded to turn to this perpendicular direction, step 476, FIG. 10B, after which delta theta B is set to theta$_{turn}$, step 476. Now that the robot is facing directly toward the object, a final reading of the head ultrasonics are taken to obtain distance R$_{HA}$, step 478. The deviation in distance traveled along the X-axis is determined by the formula $$\Delta X = R_{HE} - B_{HA} \tag{2}$$

and delta X and delta theta$_B$ are output to motor controller 330 through arbiter 408, steps 480, 482, respectively. The position X$_M$ of the robot is adjusted by delta X, step 483. The end-path calibration system cycles to step 460 to resume monitoring.

The body angle calibration system corrects for accumulated error in orientation which is due to the drift or precession of base 14. Path deviation distance Y$_M$ occurs during obstacle avoidance, for example, and changes in head orientation represented by theta$_M$ can be attributed to rotation of head 12 while tracking a beacon to correct for precession of the body. Body angle calibration system 406 corrects and calibrates for each of these variables.

Figure 11A:
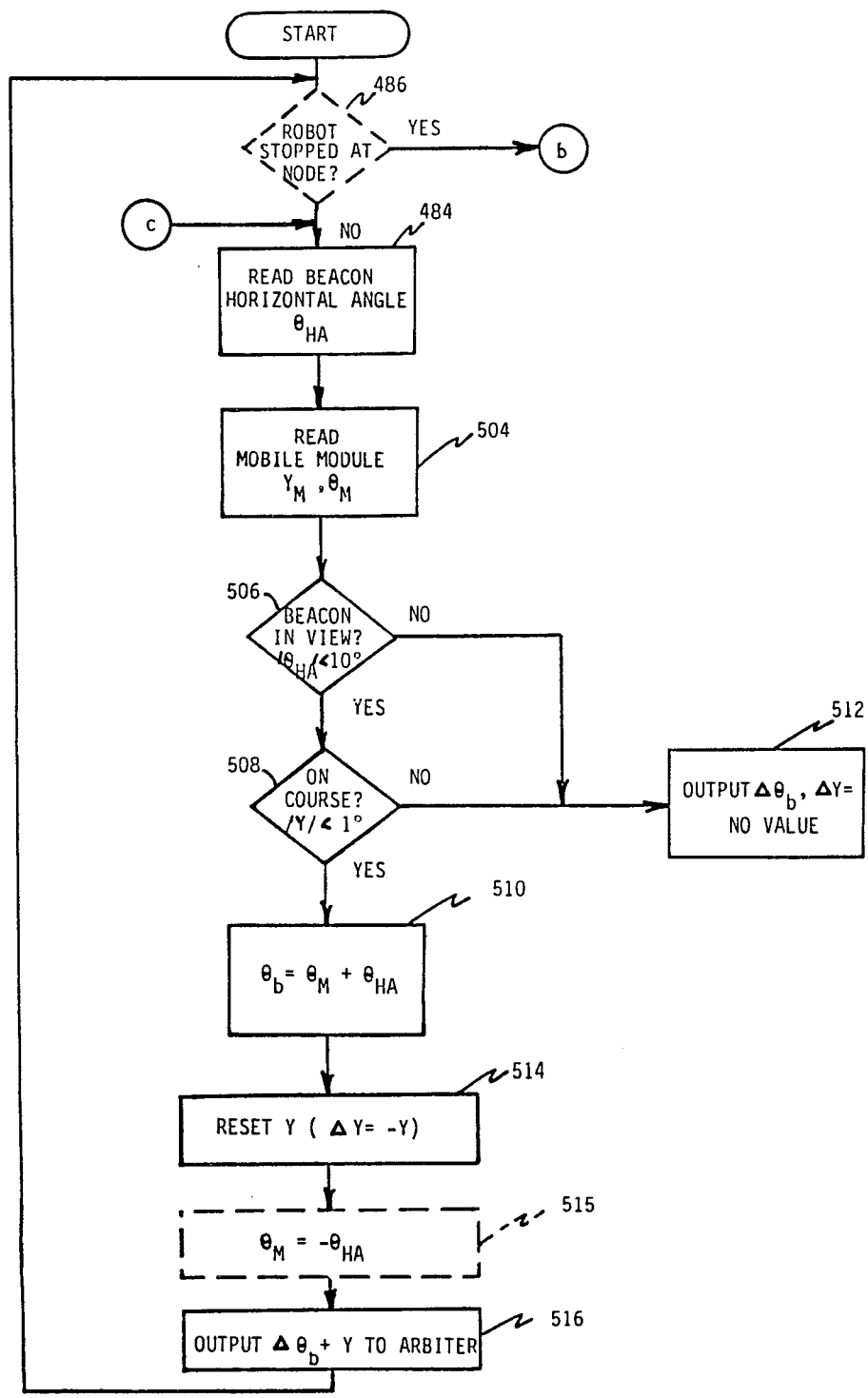
FIGS. 11A and 11B are flow charts of body angle calibration of FIG. 8A.
Figure 11B:
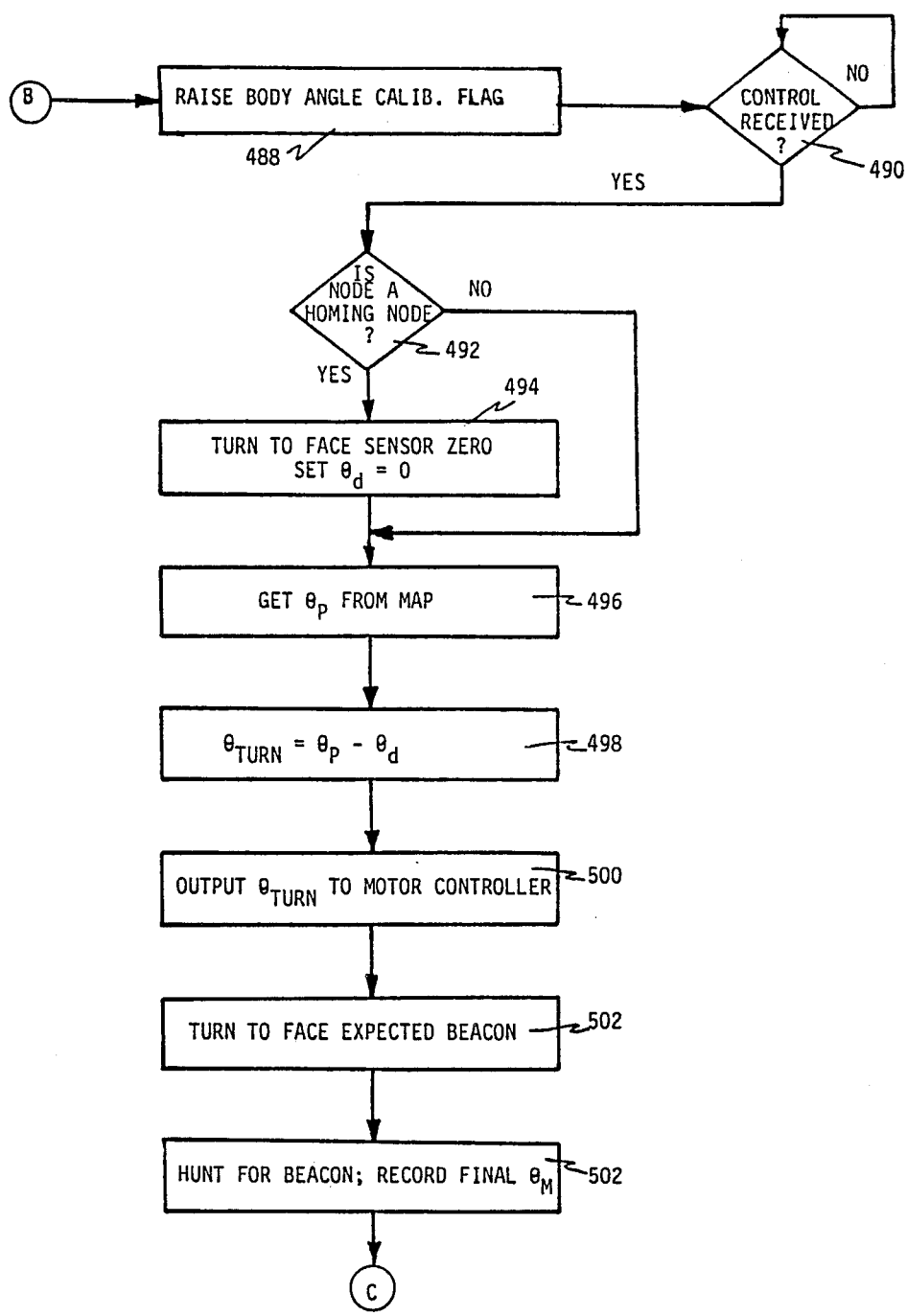

In operation, the beacon horizontal angle theta$_{HA}$ is read, step 484, FIG. 11A. Optionally, such as shown in phantom by step 486, the operation first determines whether the robot is stopped at a node and, if it is, raises body angle calibration flag, step 488, FIG. 11B. Once control is received, step 490, the system determines whether the node is a homing node, step 492. If it is, the robot turns to face sensor zero, step 494 and direction angle theta$_D$ is set to zero. Otherwise, operation proceeds directly to step 496 where path direction theta$_P$ is obtained from the map 402. The turn angle theta$_{turn}$ is set to the distance direction theta$_D$ subtracted from path orientation theta$_P$, step 498.

Once turn angle theta$_{turn}$ is, that value is output to motor controller 330, FIG. 6, step 500. The robot turns to face the expected beacon and hunts for the beacon, steps 502, 504, respectively. The final head orientation theta$_M$ is recorded, operation proceeds to step 484, FIG. 11A, and beacon horizontal angle theta$_{HA}$ is read. At this stage, the expected deviation distance Y$_M$ and the head direction theta$_M$ are read from the mobile module, step 504. If the beacon is in view and the robot is on course, meaning that the absolute values of horizontal orientation theta$_{HA}$ is less than 10° and deviation distance Y is less than one foot, calibration of body angle is obtained by determining the increment delta theta$_B$ as equal to the sum of theta$_M$ and theta$_{HA}$, step 510. If either of steps 506 and step 508 are not satisfied, meaning that the robot has significantly deviated from the path, no value is output, step 512, and other calibration systems such as end-path calibration are tried.

Once the increment delta theta$_B$ is determined, Y is reset by setting delta Y to negative Y, step 514, and delta theta$_B$ and Y are provided to the arbiter, step 516. Optionally, head angle theta$_M$ is reset by setting it equal to minus horizontal angle theta$_{HA}$, step 515, shown in phantom. Operation then returns to steps 486, 484 as described above.

In its simplest construction, body angle calibration involves reading the beacon horizontal angle theta$_{HA}$, turning to face the beacon, setting delta theta$_B$ to theta$_{HA}$, and outputting delta theta$_B$. In blackboard 410, delta theta$_B$ is initially set to zero and then incremented as needed by either the body angle calibration or end-path calibration systems.

Figure 12:
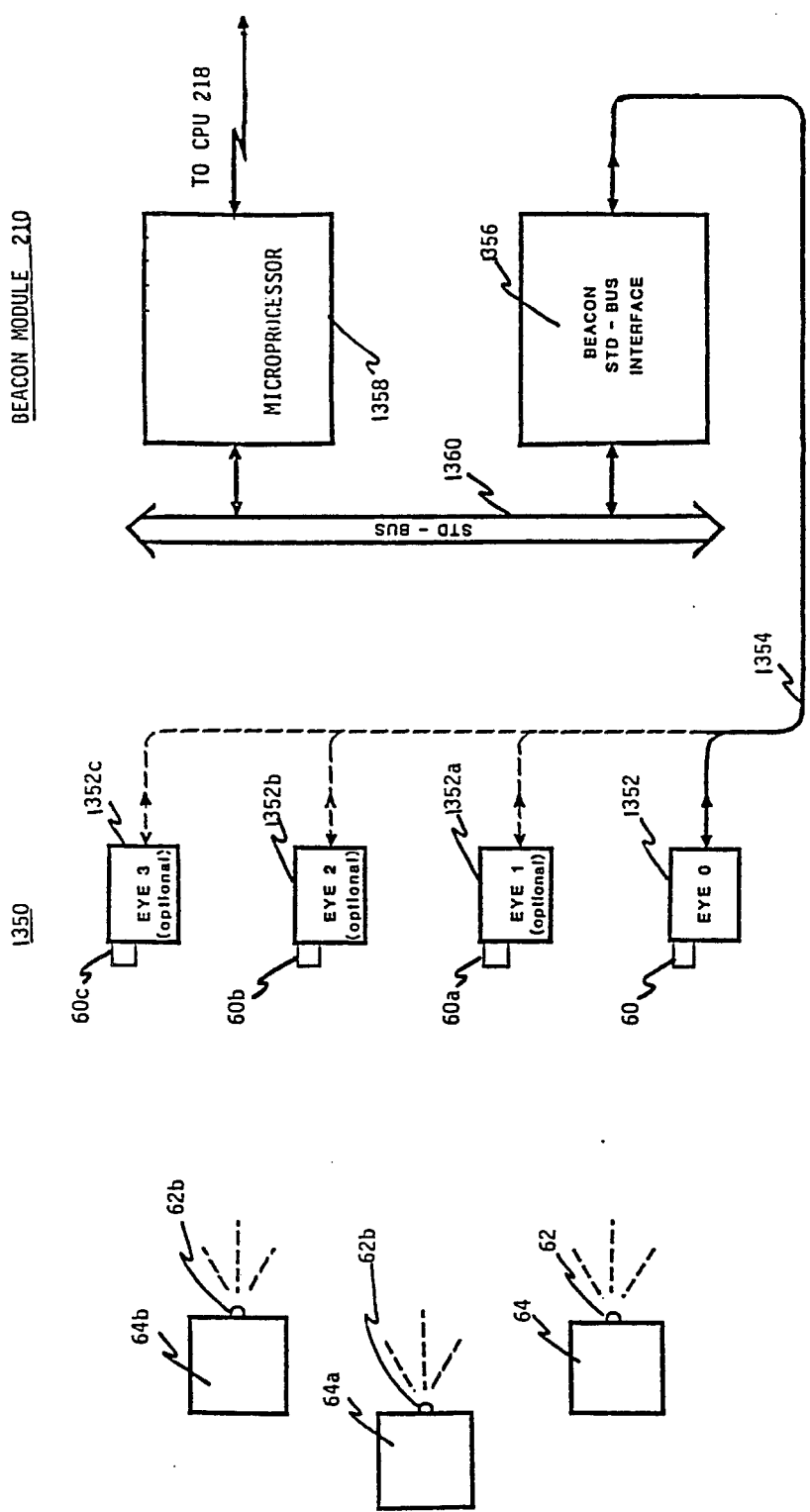
FIG. 12 is a block diagram of position locating including beacon sensors and the beacon electronic module.

Position locating system 1350, FIG. 12, includes one or more beacon transmitters 64, 64a, 64b, each having an infrared source 62, 62a, 62b. Also included is an infrared sensor 60 sensitive to the infrared radiation emitted by source 62, and associated with sensor 60 is an eye circuit 1352 whose output is provided on bus 1354. Bus 1354 interconnects with beacon STD-bus interface 1356 in beacon module 210. Interface 1356 communicates with microprocessor 1358 over STD bus 1360. Microprocessor 1358 may be a Z80 and it communicates directly with CPU 218, which may be a 68000.

Figure 13:
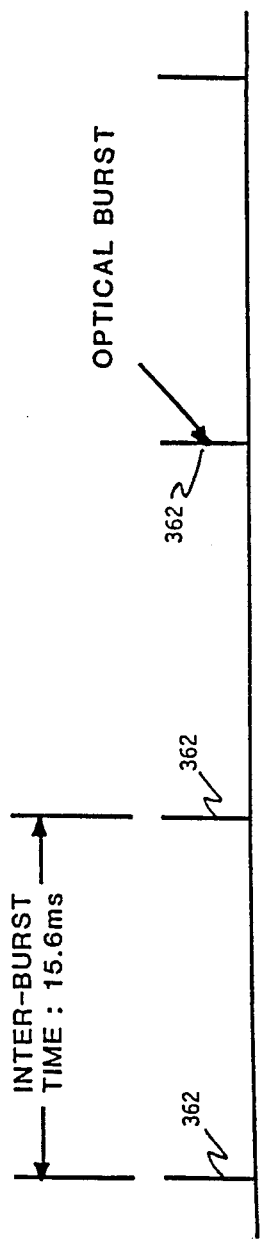
FIG. 13 is an illustration of the optical burst output of the beacons of FIG. 12.
Figure 14:
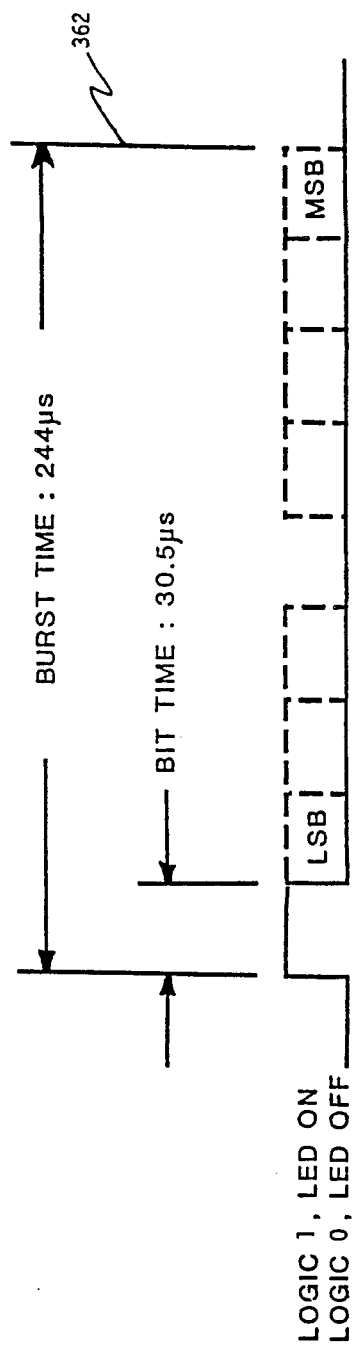
FIG. 14 is an enlarged detail of a single burst of FIG. 13.
Figure 15:
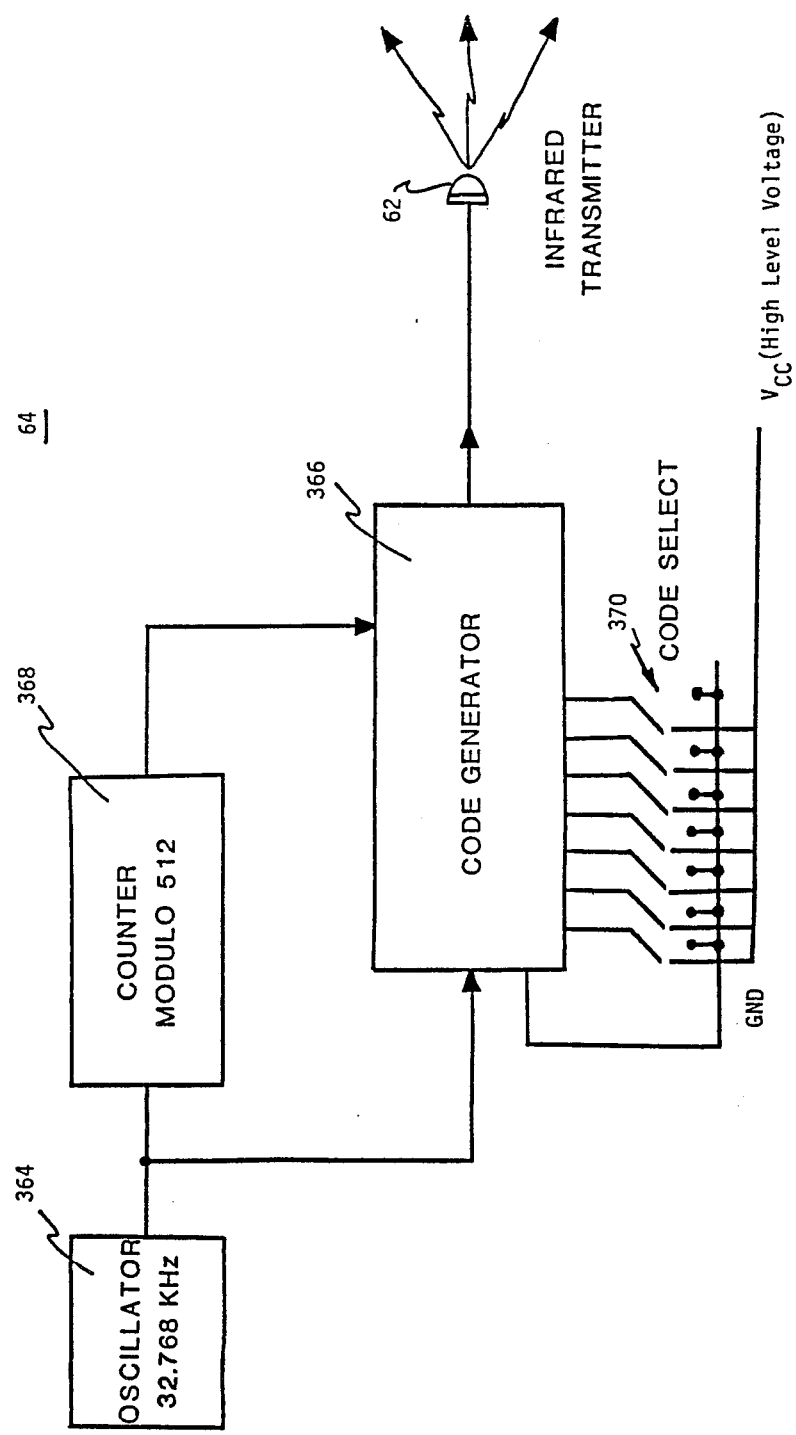
FIG. 15 is a more detailed block diagram of a beacon shown in FIG. 12.

Beacon transmitter 64 provides an optical burst 1362 of coded signals every 15.6 milliseconds, FIG. 13. Each burst, as shown in greater detail in FIG. 14, has a total burst time of 244 microseconds which defines an eight-bit word, each bit being 30.5 microseconds wide. The first bit is a start bit; the next seven bits are code bits and represent 128 different possible codes. Each code can uniquely identify a single beacon, so that with this simple arrangement one hundred twenty-eight different beacons can be uniquely identified; that is, when the infrared source is seen that is considered a logic one. When the infrared source, which may be a light-emitting diode or LED, is off, then the signal is low and is considered a logic zero. The signals shown in FIGS. 13 and 14 are generated in beacon transmitter 64 by an oscillator 1364, FIG. 15, which runs continuously at 32.768 KHz. Its output is delivered directly to a register in code generator 1366. Its output is also delivered to a counter 1368, modulo 512, which divides the 32.768 KHz signal to provide the time period shown in FIGS. 13 and 14. That is, with every 64th pulse (or every 5.6 ms) a burst occurs of eight bits. Eight bits are set to one or zero to produce the unique code for a particular beacon by the setting of the code select keys 1370. When one of the keys 1370 is toggled to ground, the associated stage of the register in 1366 is grounded, thereby placing a logic one in that bit position. Switches that are left toggled to high voltage produce a logic zero in the associated stage. The patterns of ones and zeros modulate the infrared radiation produced by LED 62 so that a coded signal is provided which uniquely defines the particular beacon.

Figure 16:
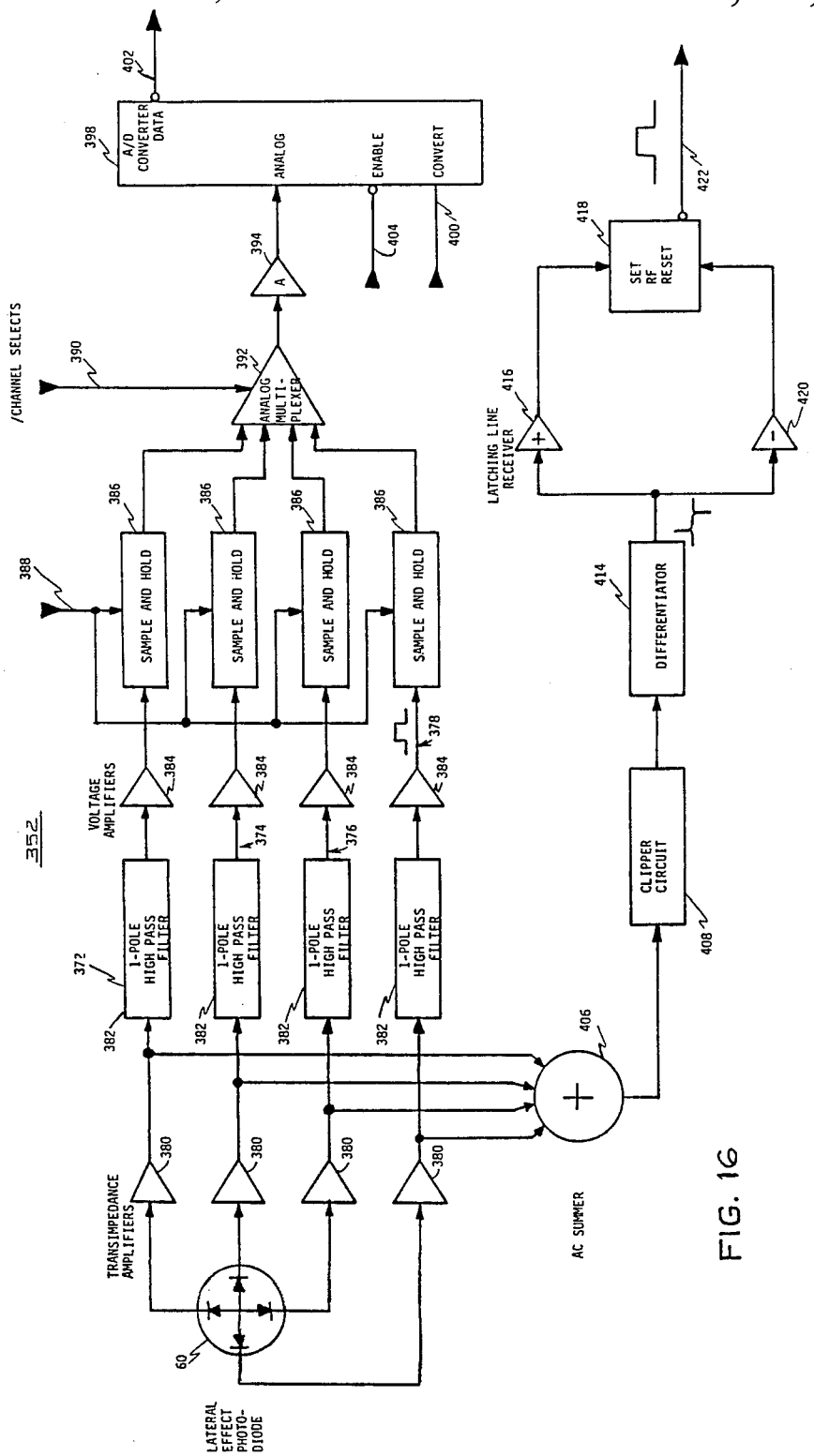
FIG. 16 is a more detailed block diagram of an eye shown in FIG. 12.

Sensor 60 in eye circuit 1352, FIG. 16, is a multisector sensor such as a dual-axis lateral effect photodiode. It provides four separate outputs, each indicative of the infrared radiation incident on its particular sector. By analyzing the relative values of the radiation falling on the different sectors, a determination can be made as to the angle of the sensor to the emitting beacon. Each of the four sector outputs from photodiode 60 is fed to a different channel 1372, 1374, 1376, 1378. Each channel includes an amplifier 1380, high-pass filters 1382, voltage amplifiers 1384, and sample and hold circuits 1386. High-pass filters 1382 pass the coded signal from beacon 64 but block 60-cycle and 120-cycle signals introduced by ambient light conditions; periodically on command from microprocessor 1358 a signal on sample and hold line 1388 causes sample and hold circuits 1386 to sample and hold the signal in each channel. Those signals are then multiplexed by analog multiplexer 1392 as directed by a command from microprocessor 1358 on line 1390. The signal from each channel is fed directly to the gain control of amplifier 1394. Finally, the output from each channel is fed to A/D converter 1398, where it stops unless a control signal on line 1400 from microprocessor 1358 requests the angle data signal on line 1402. Microprocessor 1358 also provides a select and enable signal on line 1404 to A/D converter 1398 to indicate the particular eye circuit 1352, 1352a, 1352b or 1352c which is currently being interrogated.

Simultaneously with this, one or more of the outputs from photodiode 60 after passing through amplifiers 1380 are combined in an AC summer 1406 in order to maximize the signal which will be used to detect the identifying code. From summer circuit 1406 the signal is passed to clipper circuit 1408 which limits the output independent of the input amplitudes. At this point the signal is constituted by one or more coded pulses riding on an envelope of sixty or one hundred twenty cycle noise. Differentiator circuit 1414 is therefore used to detect only the transitions of the pulses; thus, for every positive-going transition a positive spike appears at the output of differentiator 1414 and for every negative-going transition a negative spike occurs at the output of differentiator 1414. The positive-going spikes pass through amplifier 1416 and set flip-flop 1418 to define the beginning of a pulse. Negative-going spikes passing through amplifier 1420 reset flip-flop 1418 and define the end of the pulse. In this way the pulses and the received coded signal are reconstituted one at a time to construct the code data signal on line 1422. The output of flip-flop 1418 may again be switched to indicate which one of the eye circuits 1352, 1352a, 1352b or 1352c is currently being monitored.

Figure 17:
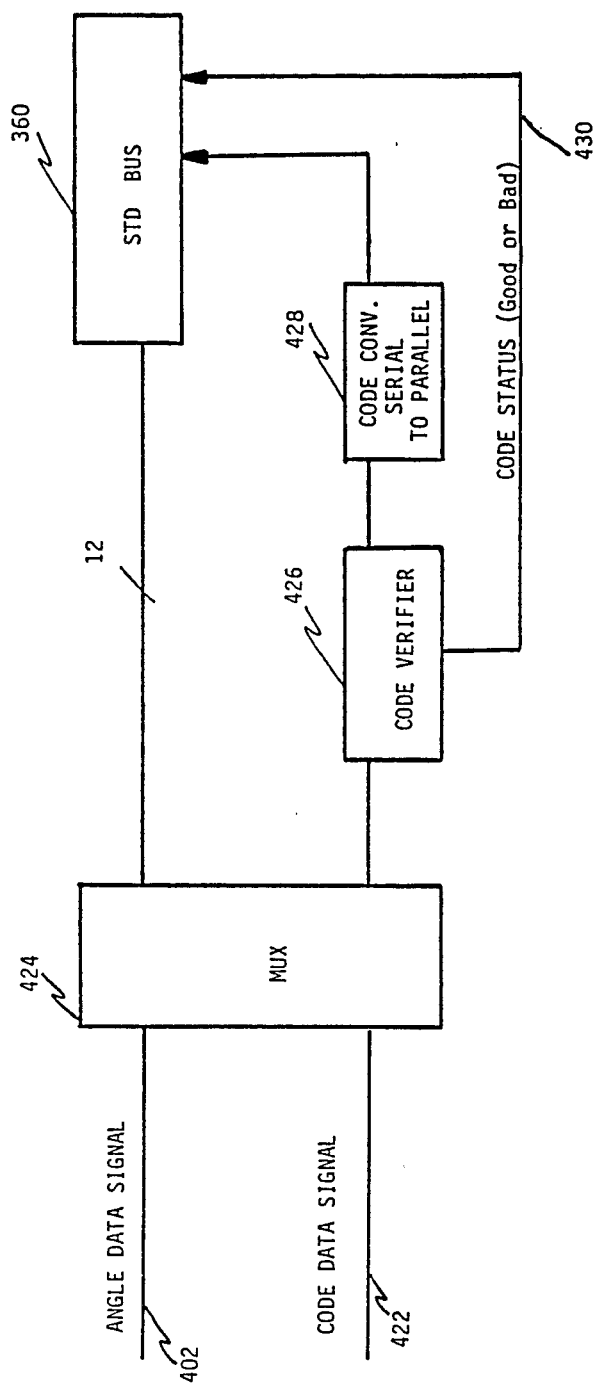
FIG. 17 is a more detailed block diagram of the beacon STD-bus interface of FIG. 12.

The angle data signal on line 1402, FIG. 17, is fed directly through MUX 1424 in beacon STD-bus interface 1356 to STD-bus 1360. The code data signal is fed from MUX 1424 to code verifier circuit 1426. After it is verified it is submitted to a converter 1428 where it is changed from a serial signal to a parallel signal and then provided to STD-bus 1360. Code verifier circuit 1426 may utilize any of a number of techniques for verifying the authenticity of an incoming code. For example, the incoming signal may be sampled at fixed times following a start pulse when pulse transitions would normally be expected in a valid signal. If the transitions occur within narrow windows at the expected times, they are treated as valid code; otherwise they are rejected. The code status is provided on line 1430 to STD-bus 1360.

Figure 18A:
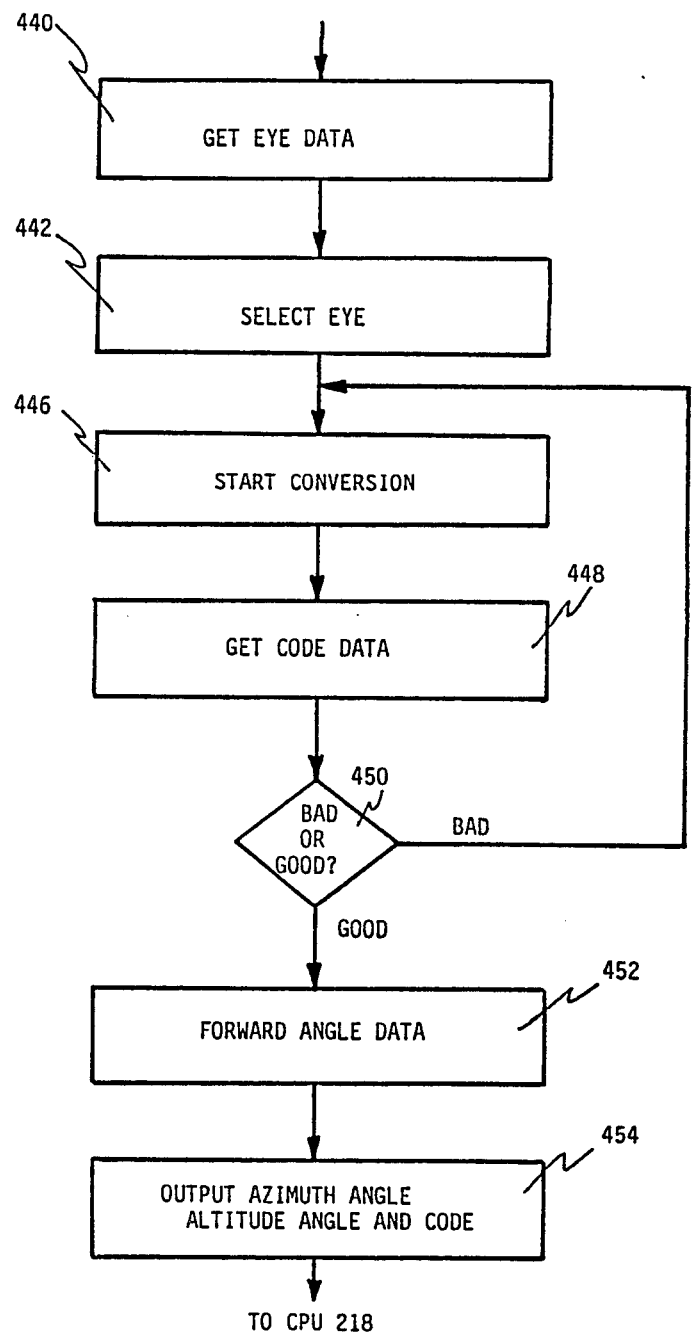
FIGS. 18A and 18B are flow charts of the software utilized in the microprocessor of FIG. 12.
Figure 18B:
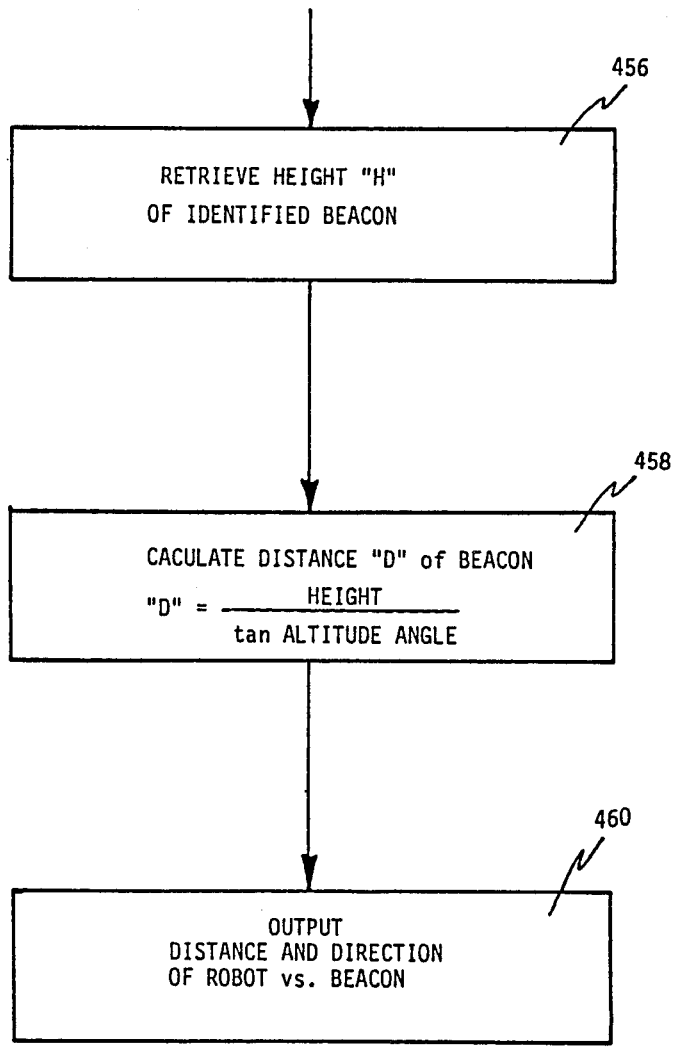

Under software control, operation may begin with a signal from CPU 218 in step 1440, FIGS. 18A and 18B, with the command "Get Eye Data". When microprocessor 1358 receives that signal it selects a particular eye in step 1442. The A/D converter is then commanded to start the conversion in step 1446 and the code data is obtained on line 1422 in step 1448. In step 1450, if the code data is bad the cycle starts again with the beginning of a new conversion in step 1446. If the code is good then the angle information is used and the next step 1452 provides the azimuth angle and the altitude angle and the code in step 1454 to microprocessor 1358. Here the angle data is converted to the azimuth angle and the altitude angle and combined with the code and directed to CPU 218. The azimuth angle needs no further processing. The altitude angle and code are delivered to CPU 218, which then retrieves the height H of the identified beacon in step 1456; height H can be unique for that beacon, or all beacons can be placed at the same height. That height is used to calculate the distance D to the beacon by dividing the height by the tangent of the altitude angle in step 1458. Then the distance and direction of the robot versus the beacon is output in step 1460.

Figure 19:
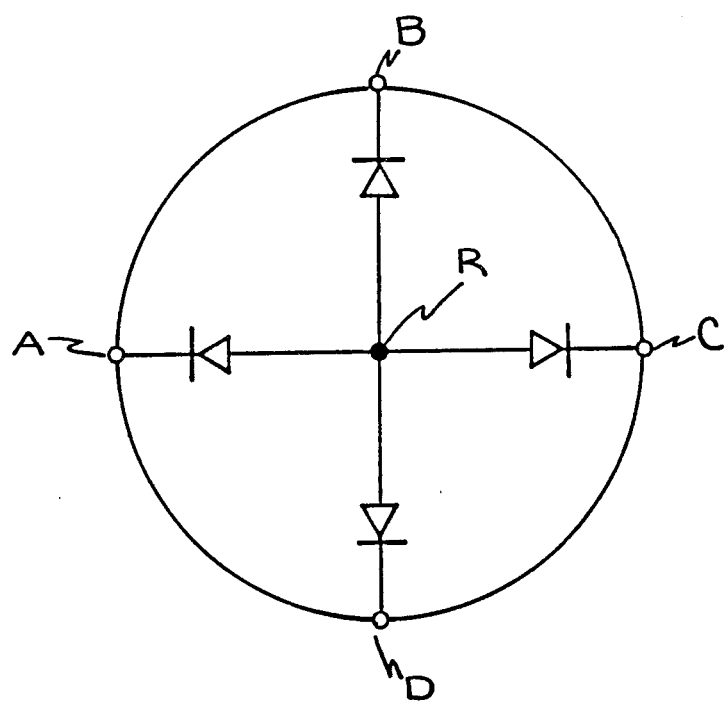
FIG. 19 is a schematic of the photodiode of FIG. 16.

The calculation in step 1454, FIG. 18A, of the azimuth angle and the altitude angle from the angle data signal is accomplished by determining the X position and the Y position from the dual axis lateral effect photodiode of FIG. 16 shown in more detail in FIG. 19. The X position is calculated according to the expression:

$$X \text{ position} = \frac{A-C}{A+C} \tag{3}$$

and the Y position by the expression:

$$Y \text{ position} = \frac{B-D}{B+D} \tag{4}$$

The division by A+C and B+D respectively normalizes the signal to reduce its dependence on the incident light level. The angles are those determined by the expression:

$$\text{Altitude Angle} = \arctan\left(\frac{B-D}{B+D} \times k\right) \tag{5}$$

$$\text{Azimuthal Angle} = \arctan\left(\frac{A-C}{A+C} \times k\right) \tag{6}$$

where K is a constant dependent on the size of the detector and focal length of the light gathering lens if one is used:

$$K = \frac{\frac{1}{2}D}{F_1} \tag{7}$$

where D is the diameter of the detector and $F_1$ is the focal length of the lens.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A proximity detection system for determining the distance between a vehicle and a navigation beacon comprising:
    detector means, responsive to the beacon, for resolving the altitude angle between the beacon and the vehicle;
    means, responsive to said resolved altitude angle and to the height of the beacon, for determining the distance between the beacon and the vehicle; and
    means for defining an optimum distance between the beacon and the vehicle and for comparing said determined distance and said optimum distance to establish any difference between them.

2. The proximity detection system of claim 1 further including means for supplying to said means for defining the height of the beacon and an additional known geometric parameter for said optimum distance.

3. The proximity detection system of claim 2 in which said means for defining includes means for generating the difference in distance of the vehicle as a function of said resolved altitude angle, said known geometric parameter and said known height.

4. The proximity detection system of claim 3 in which said additional known geometric parameter is the expected altitude angle between said detector means and the beacon at said optimum distance.

5. The proximity detection system of claim 4 in which said means for defining calculates the difference in position according to the formula:

$$\Delta X = (\theta_{VE} - \theta_{VA}) \frac{e}{\sin^2(\theta_{VA})}$$

where delta x is the difference in position, $\theta_{VE}$ is the expected vertical angle, $\theta_{VA}$ is the actual vertical angle, and e is the known height of the beacon.

6. The proximity detection system of claim 3 in which said additional known geometric parameter is the expected horizontal distance of said vehicle to the beacon.

7. The proximity detection system of claim 2 in which said means for supplying includes memory means for storing said known height and said known geometric parameter.

8. The proximity detection system of claim 1 in which said detector means includes:
   a multisector sensor for sensing a signal emitted by the beacon; and
   means responsive to said sensor sectors for generating an angle data signal representative of the angle from said sensor to the beacon in at least the altitudinal dimension.

9. The proximity detection system of claim 8 in which said sensor is a lateral effect photodiode.

10. The proximity detection system of claim 8 in which said detector means further includes means, responsive to said altitudinal angle, for calculating the direction from the sensor to the beacon.

11. The proximity detection system of claim 1 further including means for adjusting the position of the vehicle by the established difference.

12. The proximity detection system of claim 1 further including inclinometer means for sensing deviation of said vehicle from vertical.

13. The proximity detection system of claim 12 in which said means for defining includes means for combining said vertical deviation and said resolved altitude angle with each other and substituting the combined value for said resolved altitude angle to establish the difference in position.

14. A proximity detection system for determining the distance between a mobile robot and a navigation beacon, comprising:
   a mobile robot;
   detector means, responsive to the beacon, for resolving the altitude angle between the beacon and said robot;
   means, responsive to said resolved altitude angle and to the height of the beacon, for determining the distance between the beacon and said robot;
   means for defining an optimum distance between the beacon and said robot and for comparing said determined distance and said optimum distance to establish any difference between them.

15. The proximity detection system of claim 14 further including means for adjusting the position of said robot by said established difference.

16. The proximity detection system of claim 14 in which said robot includes a synchro-drive locomotion system.

17. A proximity detection system for determining the distance between a vehicle and a navigation beacon, comprising:
   at least one beacon;
   detector means, responsive to said beacon, for resolving the altitude angle between said beacon and the vehicle;
   means, responsive to said resolved altitude angle and to the height of said beacon, for determining the distance between said beacon and the vehicle; and
   means for defining an optimum distance between said beacon and the vehicle and for comparing said determined distance and said optimum distance to establish any difference between them.

18. The system of claim 17 in which said beacon includes means for emitting detectable energy.

19. The system of claim 18 in which said beacon is a point source.

20. The system of claim 18 in which said beacon includes means for producing said energy in a coded signal which uniquely identifies that beacon.

21. The system of claim 20 further including means for supplying the height of that uniquely identified beacon.

22. The system of claim 21 in which said means for supplying includes memory means, disposed in said vehicle, for storing the known height for that beacon.

23. The system of claim 20 in which said detector means includes:
   a multisector sensor for sensing the signal emitted by said beacon;
   means, responsive to said sensor, for generating a code data signal representative of said coded signal; and
   means, responsive to said sensor sectors, for generating an angle data signal representative of the angle from said sensor to said beacon in at least the azimuthal dimension.

24. The system of claim 17 in which said beacon is positioned along the axis corresponding to the intended direction of travel of said vehicle.

* * * * *